United States Patent
Ueda

(10) Patent No.: US 10,085,267 B2
(45) Date of Patent: Sep. 25, 2018

(54) MOBILE COMMUNICATION SYSTEM, GATEWAY DEVICE, CORE NETWORK DEVICE, AND COMMUNICATION METHOD

(71) Applicant: NEC Corporation, Tokyo (JP)

(72) Inventor: Yoshio Ueda, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 15/035,089

(22) PCT Filed: Sep. 5, 2014

(86) PCT No.: PCT/JP2014/073475
§ 371 (c)(1),
(2) Date: May 6, 2016

(87) PCT Pub. No.: WO2015/068457
PCT Pub. Date: May 14, 2015

(65) Prior Publication Data
US 2016/0278097 A1  Sep. 22, 2016

(30) Foreign Application Priority Data

Nov. 6, 2013 (JP) .................................. 2013-230544

(51) Int. Cl.
*H04W 72/04* (2009.01)
*H04W 28/08* (2009.01)
*H04W 88/12* (2009.01)

(52) U.S. Cl.
CPC ....... *H04W 72/0486* (2013.01); *H04W 28/08* (2013.01); *H04W 88/12* (2013.01)

(58) Field of Classification Search
CPC .. H04W 72/0486; H04W 72/04; H04W 28/08
See application file for complete search history.

(56) References Cited

U.S. PATENT DOCUMENTS 9,572,198 B1 * 2/2017 Shah .................... H04W 92/02
2010/0008245 A1 * 1/2010 Viger ................... H04L 47/193
370/252

(Continued)

FOREIGN PATENT DOCUMENTS

CN 102111825 A 6/2011
CN 102196404 A 9/2011

(Continued)

OTHER PUBLICATIONS

3GPP TS 36.300 V11.5.0 $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), Mar. 2013.

(Continued)

*Primary Examiner* — Wei Zhao
(74) *Attorney, Agent, or Firm* — Finnegan, Henderson, Farabow, Garrett & Dunner, L.L.P.

(57) ABSTRACT

This mobile communication system has a portable terminal, a base station that wirelessly communicates with the portable terminal, a gateway device that connects the base station to a core network, and a core network device that is installed in the core network and that performs mobility management of the portable terminal. The core network device sends to the gateway device information for determining whether Selected Internet Protocol Traffic Offload (SIPTO) has been activated. The gateway device receives the information from the core network device.

11 Claims, 25 Drawing Sheets

(56) References Cited

U.S. PATENT DOCUMENTS

| | | | | |
|---|---|---|---|---|
| 2012/0189016 A1* | 7/2012 | Bakker | ............... | H04W 76/021 370/401 |
| 2012/0224536 A1* | 9/2012 | Hahn | ...................... | H04L 45/00 370/328 |
| 2012/0257598 A1 | 10/2012 | Karampatsis et al. | | |
| 2013/0315068 A1 | 11/2013 | Kim et al. | | |

FOREIGN PATENT DOCUMENTS

| | | |
|---|---|---|
| CN | 102238634 A | 11/2011 |
| JP | 2013-17093 | 1/2013 |
| WO | WO 2012/108660 A2 | 8/2012 |
| WO | WO 2012/112571 A1 | 8/2012 |
| WO | WO 2012-135476 | 10/2012 |
| WO | WO 2012/138760 A1 | 10/2012 |

OTHER PUBLICATIONS

3GPP TS 23.401 V12.1.0 $3^{rd}$ Generation Partnership Project; Technical Specification Group Services and System Aspects; General Packet Radio Service (GPRS) enhancements for Evolved Universal Terrestrial Radio Access Network (E-UTRAN) access (Release 12), Jun. 2013.

3GPP TS 29.303 V12.0.0, $3^{rd}$ Generation Partnership Project; Technical Specification Group Core Network and Terminals; Domain Name System Procedures; Stage 3 (Release 12), Jun. 2013.

3GPP TS 36.413 V11.4.0, $3^{rd}$ Generation Partnership Project; Technical Specification Group Radio Access Network; Evolved Universal Terrestrial Radio Access Network (E-UTRAN); S1 Application Protocol (S1AP) (Release 11), Jun. 2013.

3GPP TS 32.782 V11.0.0, $3^{rd}$ Generation Partnership Project; Technical Specification Group Services and System Aspects; Telecommunication management; Home enhanced Node B (HeNB) Subsystem (HeNS); Network Resource Model (NRM); Integration Reference Point (IRP): Information Service (IS) (Release 11), Sep. 2012.

3GPP TS 32.752 V11.0.1, $3^{rd}$ Generation Partnership Project; Technical Specification Group Services and System Aspects; Telecommunication management; Evolved Packet Core (EPC) Network Resource Model (NRM) Integration Reference Point (IRP); Information Service (IS) (Release 11), Jun. 2013.

3GPP TR 36.932 V12.0.0, $3^{rd}$ Generation Partnership Project; Technical Specification Group Radio Access Network; Scenarios and Requirements for Small Cell Enhancements for E-UTRA and E-UTRAN (Release 12), Dec. 2012.

3GPP TS 23.060 V12.1.0, $3^{rd}$ Generation Partnership Project; Technical Specification Group Services and System Aspects; General Packet Radio Service (GPRS); Service description; Stage 2 (Release 12), Jun. 2013.

3GPP TS 25.413 V11.4.0, $3^{rd}$ Generation Partnership Project; Technical Specification Group Radio Access Network; UTRAN Iu interface Radio Access Netowrk Application Part (RANAP) signaling (Release 11), Jun. 2013.

3GPP TS 32.642 V11.4.0, $3^{rd}$ Generation Partnership Project; Technical Specification Group Services and System Aspects; Telecommunication management; Configuration Management (CM); UTRAN network resources Integration Reference Point (IRP); Network Resource Model (NRM) (Release 11), Dec. 2012.

NSN, "Path selection in H(e)NB and user plane handling In H(e)NB-GW", 3GPP TSG-RAN WG3 Meeting #82, R3-132099, pp. 1-4, Nov. 2013.

International Search Report and Written Opinion dated Dec. 9, 2014, in corresponding PCT International Application.

Extended European Search Report dated Jun. 14, 2017 for counterpart European Application No. 14859383.3.

Chinese Office Action dated Jul. 25, 2018 in Chinese Patent Office, counterpart Patent Application No. 201480060964.3.

English-language translation of Chinese Office Action and Search Report dated Jul. 25, 2018 in Chinese Patent Office, counterpart Patent Application No. 201480060964.3 (non-English version previously submitted on Jul. 31, 2018).

* cited by examiner

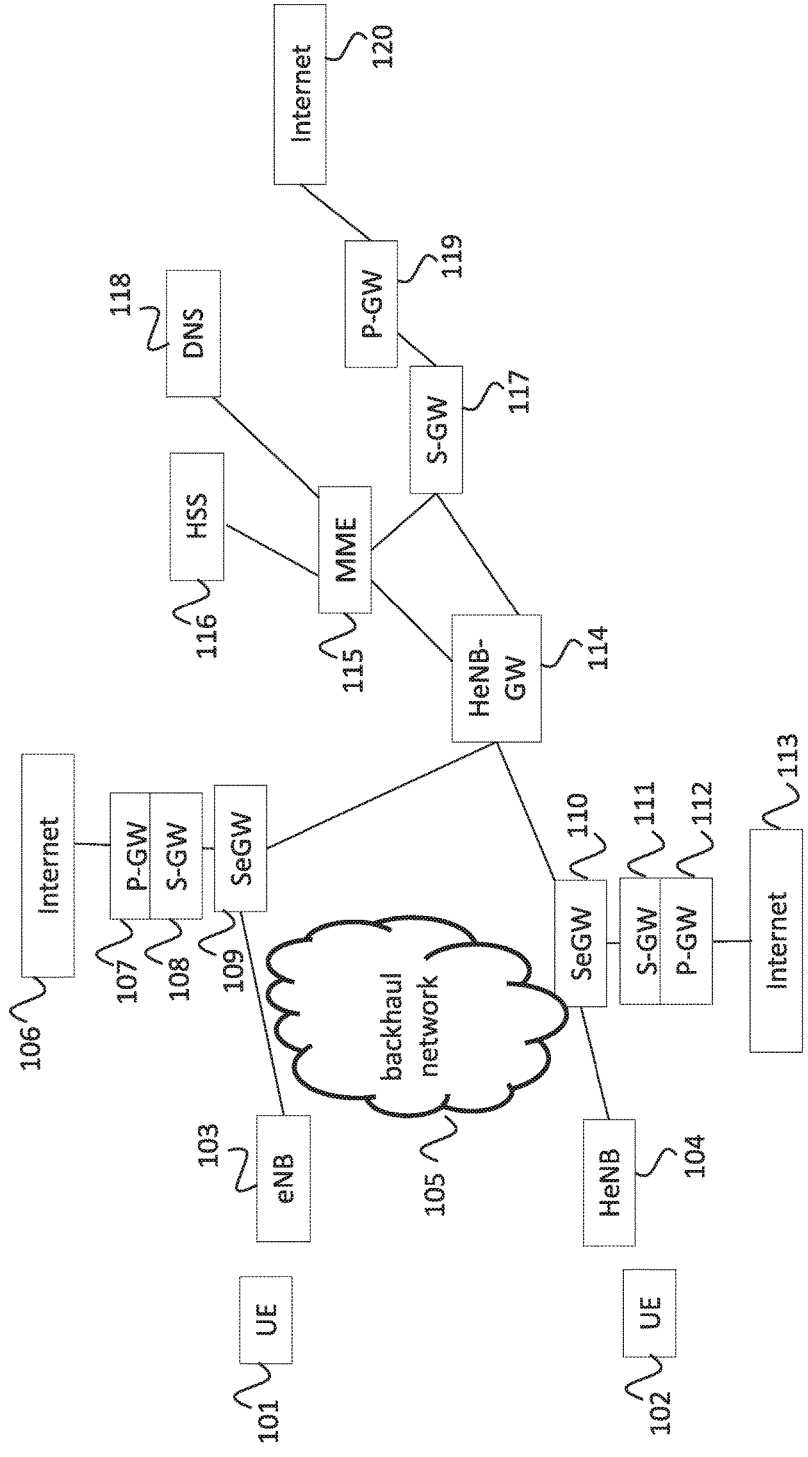

E-RAB SETUP REQUEST in the Related Art 9.1.3.1 E-RAB SETUP REQUEST

This message is sent by the MME and is used to request the eNB to assign resources on Uu and S1 for one or several E-RABs.
Direction: MME → eNB

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| UE Aggregate Maximum Bit Rate | O | | 9.2.1.20 | | YES | reject |
| E-RAB to be Setup List | | 1 | | | YES | reject |
| >E-RAB To Be Setup Item IEs | | 1 .. <maxnoof E-RABs> | | | EACH | reject |
| >>E-RAB ID | M | | 9.2.1.2 | | - | |
| >>E-RAB Level QoS Parameters | M | | 9.2.1.15 | Includes necessary QoS parameters. | - | |
| >>Transport Layer Address | M | | 9.2.2.1 | | - | |
| >>GTP-TEID | M | | 9.2.2.2 | EPC TEID. | - | |
| >>NAS-PDU | M | | 9.2.3.5 | | - | |
| >>Correlation ID | O | | 9.2.1.80 | | YES | ignore |

INITIAL CONTEXT SETUP REQUEST in the Related Art

9.1.4.1 INITIAL CONTEXT SETUP REQUEST

This message is sent by the MME to request the setup of a UE context.
Direction: MME → eNB

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| UE Aggregate Maximum Bit Rate | M | | 9.2.1.20 | | YES | reject |
| E-RAB to Be Setup List | | 1 | | | YES | reject |
| >E-RAB to Be Setup Item IEs | | 1 .. <maxnoofE-RABs> | | | EACH | reject |
| >>E-RAB ID | M | | 9.2.1.2 | | - | |
| >>E-RAB Level QoS Parameters | M | | 9.2.1.15 | Includes necessary QoS parameters. | - | |
| >>Transport Layer Address | M | | 9.2.2.1 | | - | |
| >>GTP-TEID | M | | 9.2.2.2 | | - | |
| >>NAS-PDU | O | | 9.2.3.5 | | | |
| >>Correlation ID | O | | 9.2.1.80 | | YES | ignore |
| UE Security Capabilities | M | | 9.2.1.40 | | YES | reject |
| Security Key | M | | 9.2.1.41 | The KeNB is provided after the key-generation in the MME, see TS 33.401 [15]. | YES | reject |
| Trace Activation | O | | 9.2.1.4 | | YES | ignore |
| Handover Restriction List | O | | 9.2.1.22 | | YES | ignore |
| UE Radio Capability | O | | 9.2.1.27 | | YES | ignore |
| Subscriber Profile ID for RAT/Frequency priority | O | | 9.2.1.39 | | YES | ignore |
| CS Fallback Indicator | O | | 9.2.3.21 | | YES | reject |
| SRVCC Operation Possible | O | | 9.2.1.58 | | YES | ignore |
| CSG Membership Status | O | | 9.2.1.73 | | YES | ignore |
| Registered LAI | O | | 9.2.3.1 | | YES | ignore |
| GUMMEI | O | | 9.2.3.9 | This IE indicates the MME serving the UE. | YES | ignore |
| MME UE S1AP ID 2 | O | | 9.2.3.3 | This IE indicates the MME UE S1AP ID assigned by the MME. | YES | ignore |
| Management Based MDT Allowed | O | | 9.2.1.83 | | YES | ignore |
| Management Based MDT PLMN List | O | | MDT PLMN List 9.2.1.89 | | YES | ignore |

Fig. 4

HANDOVER REQUEST in the Related Art

9.1.5.4 HANDOVER REQUEST

This message is sent by the MME to the target eNB to request the preparation of resources.

Direction: MME → eNB.

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| Handover Type | M | | 9.2.1.13 | | YES | reject |
| Cause | M | | 9.2.1.3 | | YES | ignore |
| UE Aggregate Maximum Bit Rate | M | | 9.2.1.20 | | YES | reject |
| E-RABs To Be Setup List | | 1 | | | YES | reject |
| >E-RABs To Be Setup Item IEs | | 1 .. <maxnoofE-RABs> | | | EACH | reject |
| >>E-RAB ID | M | | 9.2.1.2 | | - | |
| >>Transport Layer Address | M | | 9.2.2.1 | | - | |
| >>GTP-TEID | M | | 9.2.2.2 | To deliver UL PDUs. | - | |
| >>E-RAB Level QoS Parameters | M | | 9.2.1.15 | Includes necessary QoS parameters. | | |
| >>Data Forwarding Not Possible | O | | 9.2.1.76 | | YES | ignore |
| Source to Target Transparent Container | M | | 9.2.1.56 | | YES | reject |
| UE Security Capabilities | M | | 9.2.1.40 | | YES | reject |
| Handover Restriction List | O | | 9.2.1.22 | | YES | ignore |
| Trace Activation | O | | 9.2.1.4 | | YES | ignore |
| Request Type | O | | 9.2.1.34 | | YES | ignore |
| SRVCC Operation Possible | O | | 9.2.1.58 | | YES | ignore |
| Security Context | M | | 9.2.1.26 | | YES | reject |
| NAS Security Parameters to E-UTRAN | C-ifromUTRANGERAN | | 9.2.3.31 | The eNB shall use this IE as specified in TS 33.401 [15]. | YES | reject |
| CSG Id | O | | 9.2.1.62 | | YES | reject |
| CSG Membership Status | O | | 9.2.1.73 | | YES | ignore |
| GUMMEI | O | | 9.2.3.9 | This IE indicates the MME serving the UE. | YES | ignore |
| MME UE S1AP ID 2 | O | | 9.2.3.3 | This IE indicates the MME UE S1AP ID assigned by the MME. | YES | ignore |
| Management Based MDT Allowed | O | | 9.2.1.83 | | YES | ignore |
| Management Based MDT PLMN List | O | | MDT PLMN List 9.2.1.89 | | YES | ignore |

Fig.5

PATH SWITCH REQUEST ACKNOWLEDGE in the Related Art

9.1.5.9 PATH SWITCH REQUEST ACKNOWLEDGE

This message is sent by the MME to inform the eNB that the path switch has been successfully completed in the EPC.
Direction: MME → eNB.

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | ignore |
| eNB UE S1AP ID | M | | 9.2.3.4 | | YES | ignore |
| UE Aggregate Maximum Bit Rate | O | | 9.2.1.20 | | YES | ignore |
| E-RAB To Be Switched in Uplink List | | 0..1 | | | YES | ignore |
| >E-RABs Switched in Uplink Item IEs | | 1 .. <maxnoofE-RABs> | | | EACH | ignore |
| >>E-RAB ID | M | | 9.2.1.2 | | - | |
| >>Transport Layer Address | M | | 9.2.2.1 | | - | |
| >>GTP-TEID | M | | 9.2.2.2 | | | |
| E-RAB To Be Released List | O | | E-RAB List 9.2.1.36 | A value for E-RAB ID shall only be present once in E-RAB To Be Switched in Uplink List IE + E-RAB to Be Released List IE. | YES | ignore |
| Security Context | M | | 9.2.1.26 | One pair of {NCC, NH} is provided. | YES | reject |
| Criticality Diagnostics | O | | 9.2.1.21 | | YES | ignore |
| MME UE S1AP ID 2 | O | | 9.2.3.3 | This IE indicates the MME UE S1AP ID assigned by the MME. | YES | ignore |
| CSG Membership Status | O | | 9.2.1.73 | | YES | ignore |

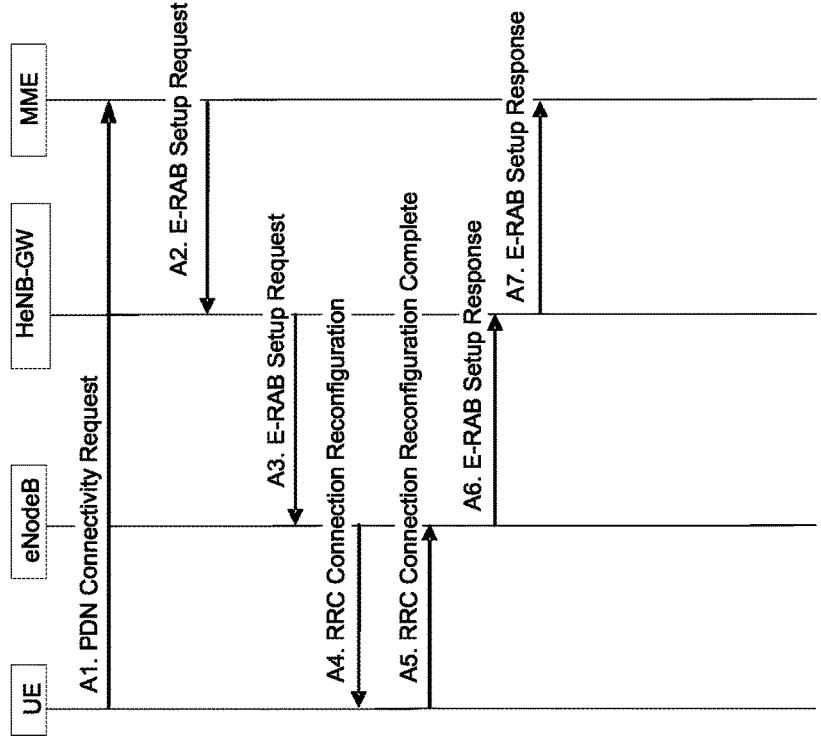
Fig.6 E-RAB Establishment Procedure in the Related Art

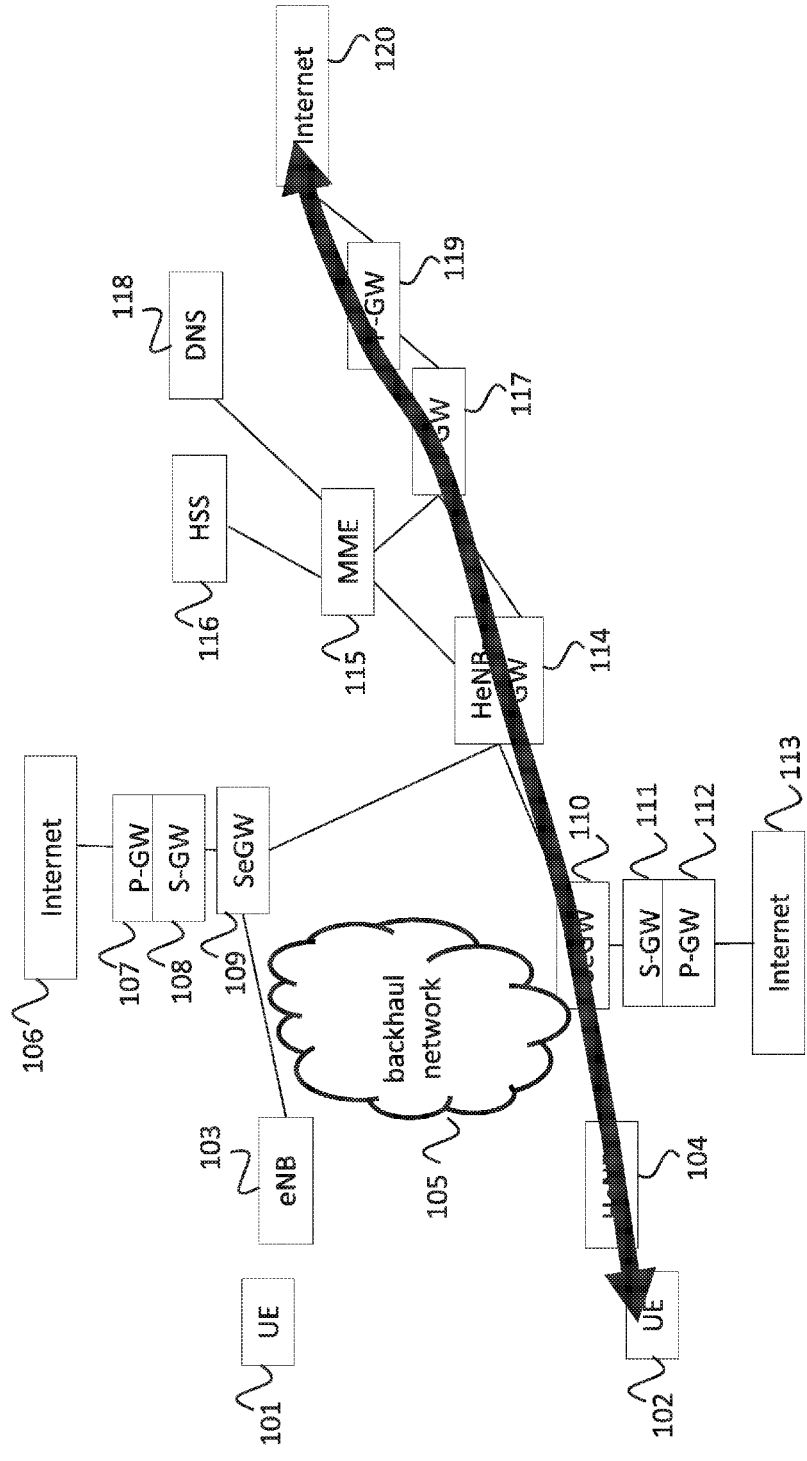

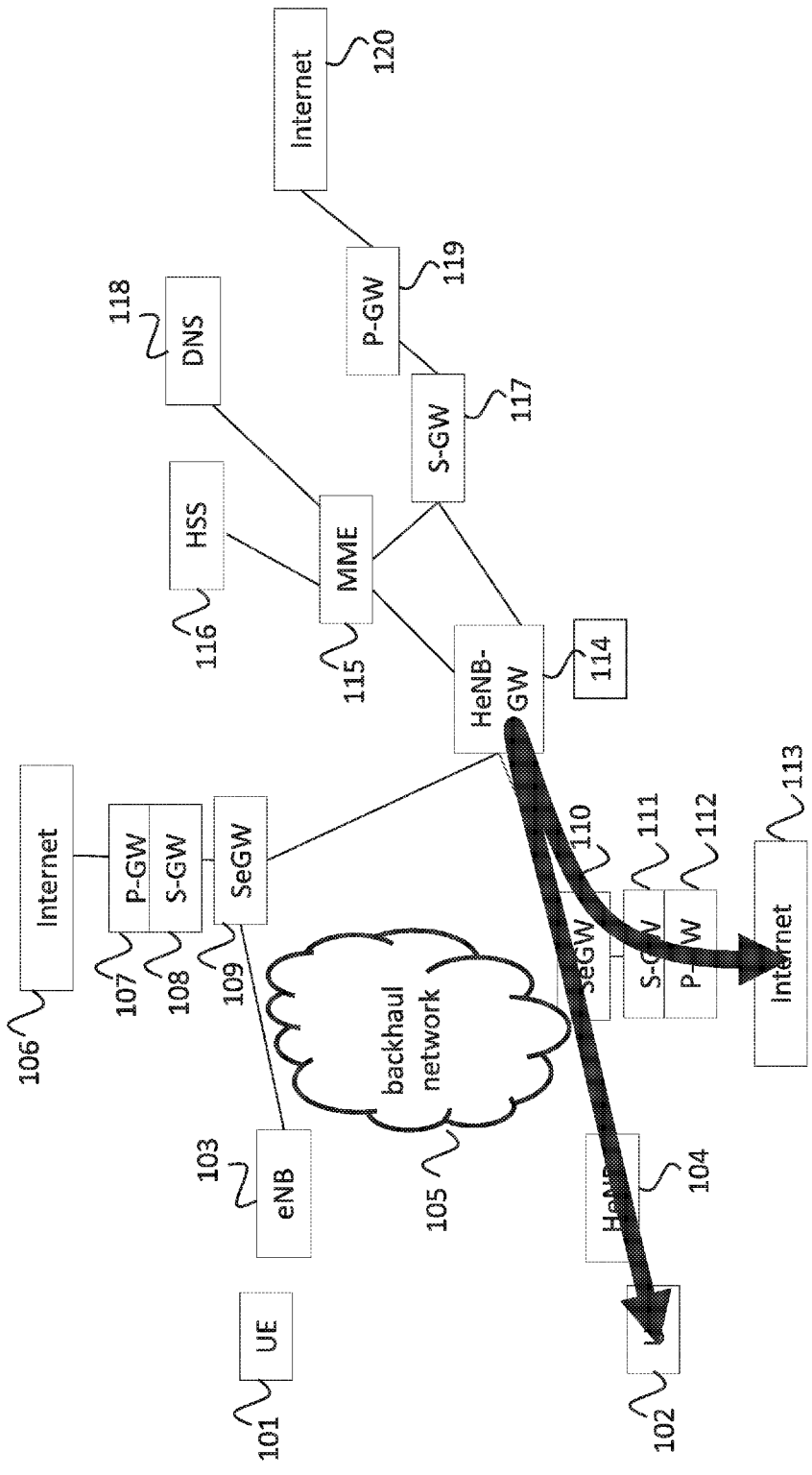

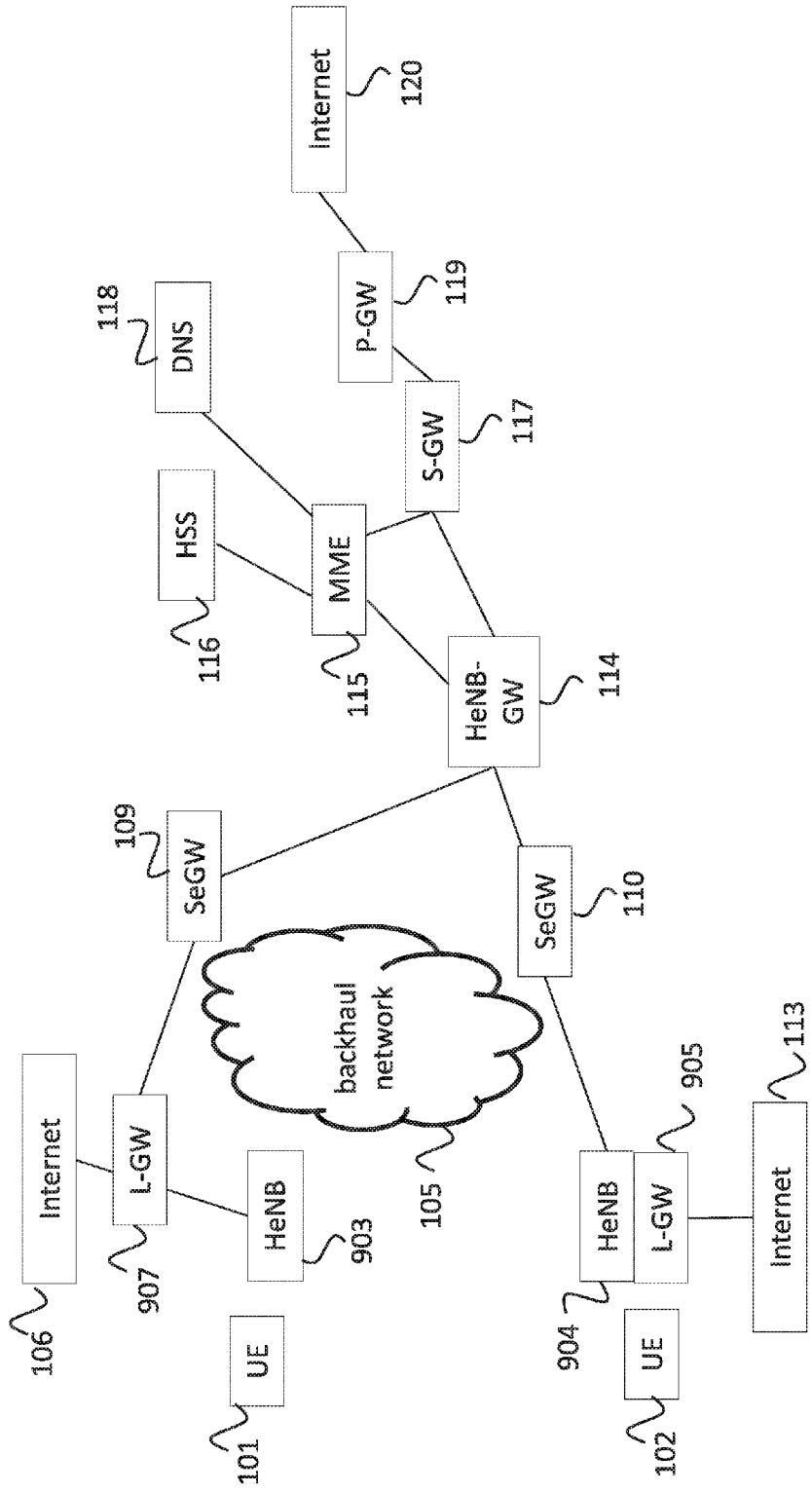

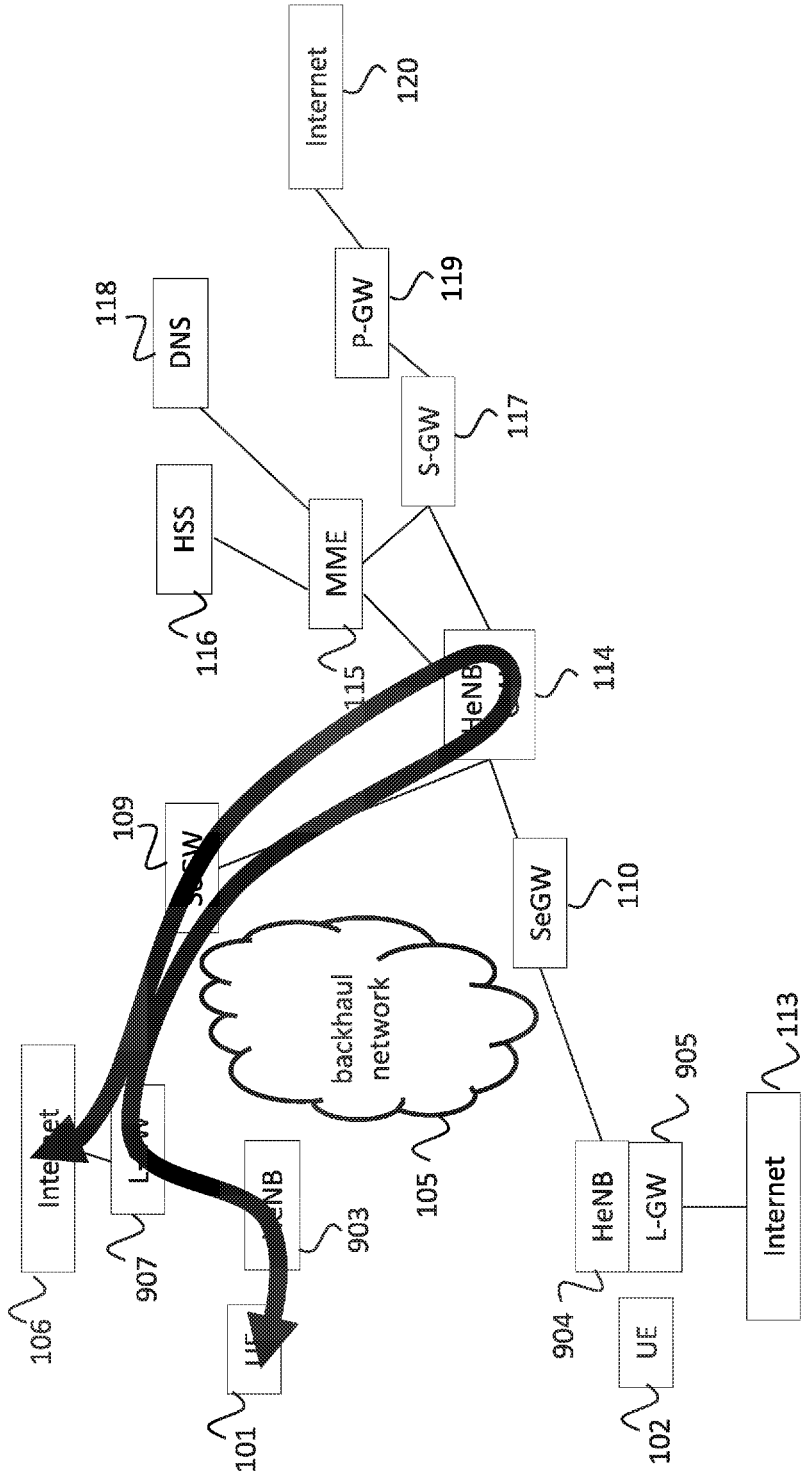

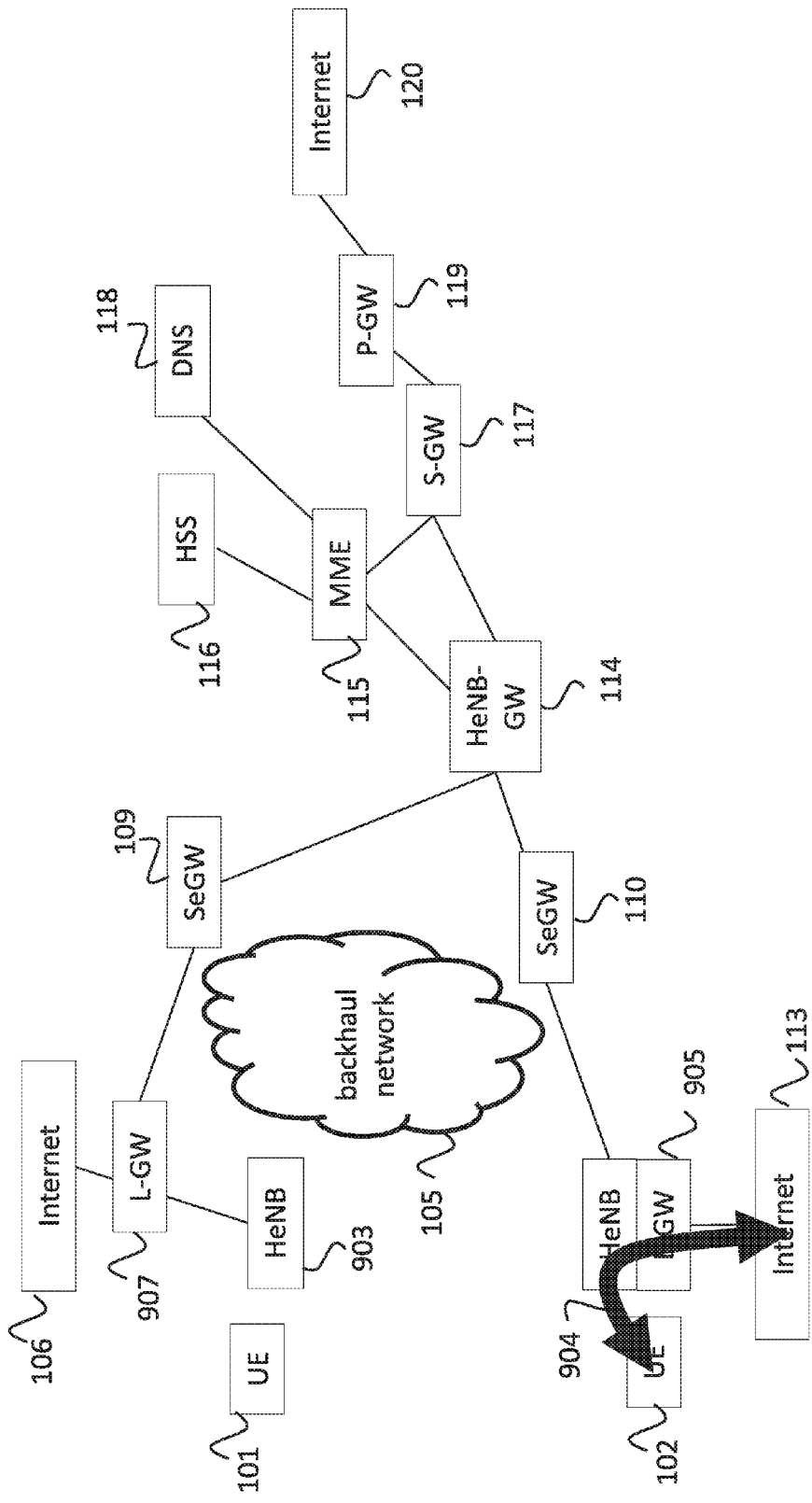

E-RAB SETUP REQUEST in the present invention

9.1.3.1 E-RAB SETUP REQUEST

This message is sent by the MME and is used to request the eNB to assign resources on Uu and S1 for one or several E-RABs.

Direction: MME → eNB

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| UE Aggregate Maximum Bit Rate | O | | 9.2.1.20 | | YES | reject |
| E-RAB to be Setup List | | 1 | | | YES | reject |
| >E-RAB To Be Setup Item IEs | | 1 .. <maxnoof E-RABs> | | | EACH | reject |
| >>E-RAB ID | M | | 9.2.1.2 | | - | - |
| >>E-RAB Level QoS Parameters | M | | 9.2.1.15 | Includes necessary QoS parameters. | - | - |
| >>Transport Layer Address | M | | 9.2.2.1 | | - | - |
| >>GTP-TEID | M | | 9.2.2.2 | EPC TEID. | - | - |
| >>NAS-PDU | M | | 9.2.3.5 | | - | - |
| >>Correlation ID | O | | 9.2.1.80 | | YES | ignore |
| >> SIPTO above RAN activation status flag | O | - | 9.2.1.80 | - | YES | ignore |

Fig.12

Configuration of SIPTO above RAN activation status flag in the present invention 9.2.1.xx SIPTO above RAN activation status flag

| IE/Group Name | Presence | Range | IE Type and Reference | Semantics Description |
|---|---|---|---|---|
| SIPTO above RAN activation status flag | M | | ENUMERATED (true) | This IE is used to identify if MME activates SIPTO above RAN. |

Fig.13

Process of Determining Whether to Activate the U-plane Relay Function in the Present Invention(in the case of SIPTO above RAN)

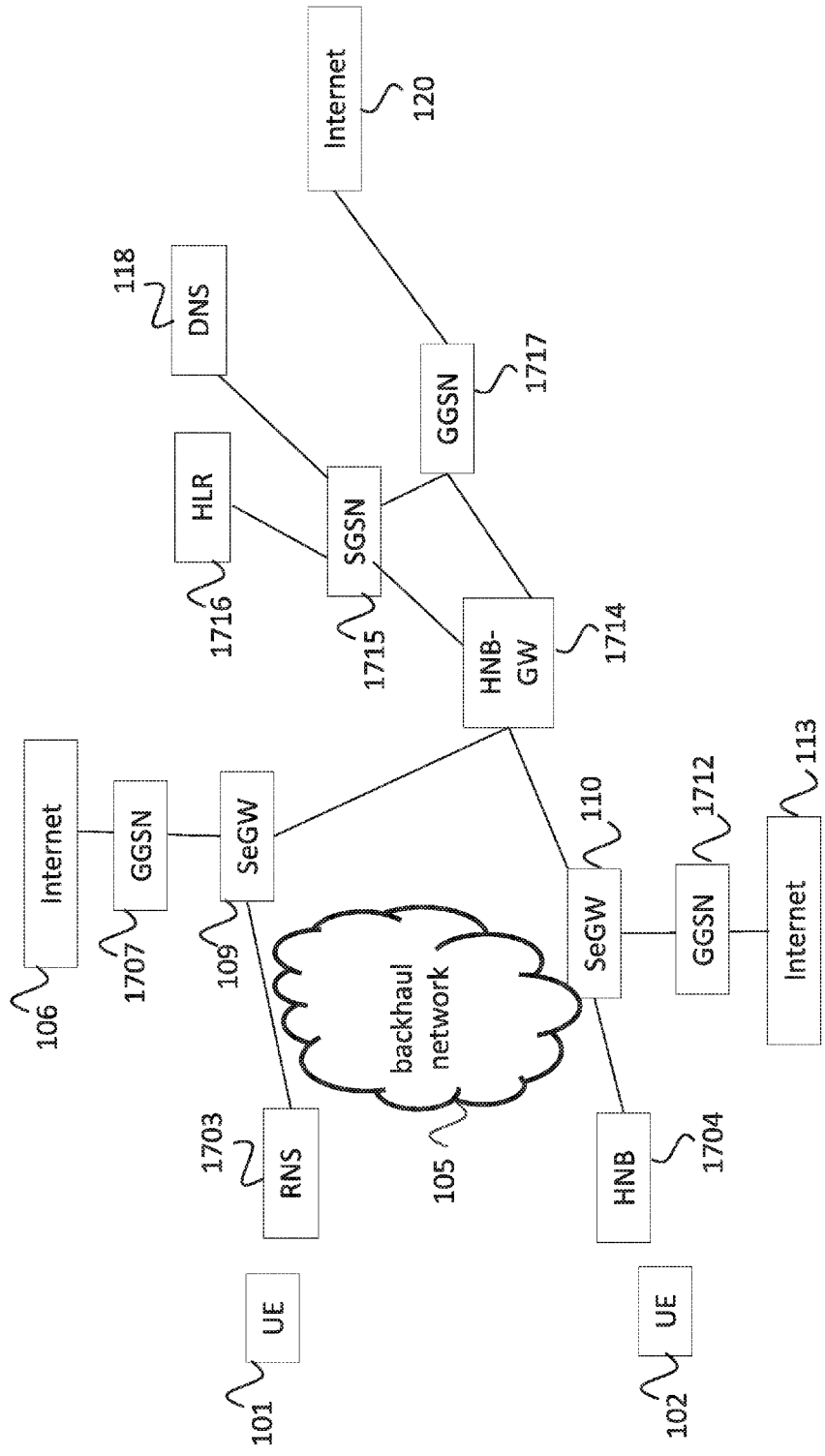

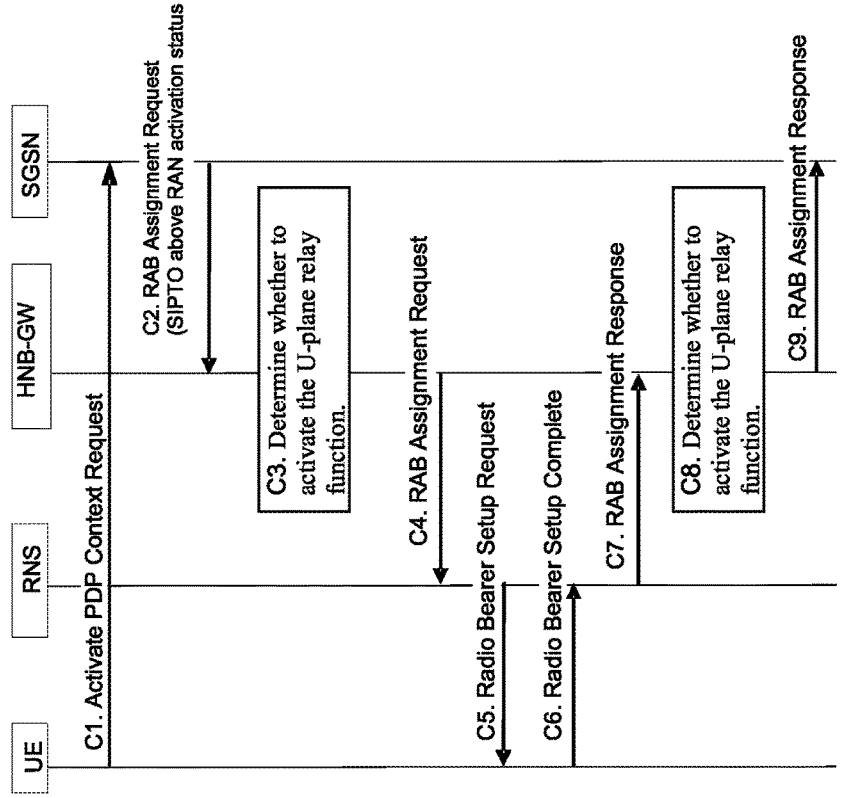
Fig.18 RAB Establishment Procedure in the Present Invention

Fig.19

E-RAB SETUP REQUEST in the present invention

9.1.3.1 E-RAB SETUP REQUEST

This message is sent by the MME and is used to request the eNB to assign resources on Uu and S1 for one or several E-RABs.
Direction: MME → eNB

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| UE Aggregate Maximum Bit Rate | O | | 9.2.1.20 | | YES | reject |
| E-RAB to be Setup List | | 1 | | | YES | reject |
| >E-RAB To Be Setup Item IEs | | 1 .. <maxnoof E-RABs> | | | EACH | reject |
| >>E-RAB ID | M | | 9.2.1.2 | | - | - |
| >>E-RAB Level QoS Parameters | M | | 9.2.1.15 | Includes necessary QoS parameters. | - | - |
| >>Transport Layer Address | M | | 9.2.2.1 | | - | - |
| >>GTP-TEID | M | | 9.2.2.2 | EPC TEID. | - | - |
| >>NAS-PDU | M | | 9.2.3.5 | | - | - |
| >>Correlation ID | O | | 9.2.1.80 | | YES | ignore |
| >> SIPTO at the local network activation status flag | O | - | 9.2.1.80 | - | YES | ignore |

Configuration of SIPTO at the local network activation status flag 9.2.1.xx SIPTO at the local network activation status flag

| IE/Group Name | Presence | Range | IE Type and Reference | Semantics Description |
|---|---|---|---|---|
| SIPTO at the local network activation status flag | M | | ENUMERATED (true) | This IE is used to identify if MME activates SIPTO at the local network |

Fig.20

Fig.22 Process of Determining Whether to Activate the U-plane Relay Function in the Present Invention (in the case of SIPTO at the Local Network)

MOBILE COMMUNICATION SYSTEM, GATEWAY DEVICE, CORE NETWORK DEVICE, AND COMMUNICATION METHOD

CROSS-REFERENCE TO RELATED PATENT APPLICATIONS

This application is a National Stage Entry of International Application No. PCT/JP2014/073475, filed Sep. 5, 2014, which claims priority from Japanese Patent Application No. 2013-230544, filed Nov. 6, 2013. The entire contents of the above-referenced applications are expressly incorporated herein by reference.

TECHNICAL FIELD

The present invention relates to a mobile communication system, a gateway device, a core network device, and a communication method.

BACKGROUND ART

Recent mobile communication systems include various base stations such as macrocell base stations, picocell base stations, and femtocell base stations. A macrocell base station forms a macrocell having a cell radius of 1 km or more, a picocell base station forms a picocell having a cell radius on the order of 0.5 km-1.5 km, and a femtocell base station forms a femtocell having a cell radius on the order of 10 m-500 m. Of these, a femtocell and a picocell in particular are referred to as small cells. In the present specification, the term "small cell" is used as appropriate.

There are generally two purposes for forming small cells: the first purpose being to supplement coverage, and the second purpose being to increase capacity.

Regarding the first purpose, the radio waves of a macrocell base station are lost due to walls of buildings and have difficulty reaching the interior of a residence. A base station that forms a small cell is therefore installed inside a residence, and this base station, by emitting radio waves, enables the reception of adequate mobile communication service even inside the residence.

Regarding the second purpose, in recent years, user traffic (user data, of which packet data are representative) has soared with the proliferation of portable telephones and the rise of smartphones. In small cells, reducing the cell radius of a base station enables a decrease of the number of people that are accommodated per cell and increases the overall capacity. In this way, the small-cell solution of reducing the cell radius of a base station is thus becoming more widespread because it can deal with the rapidly rising user traffic.

A mobile communication system in which small cells are applied is next described.

FIG. 1 shows a summary of the configuration of an LTE (Long Term Evolution) mobile communication system. FIG. 1 shows a system that allows activation of SIPTO (Selected IP Traffic Offload, where IP is an abbreviation of (Internet Protocol) above RAN (Radio Access Network), to be described hereinbelow.

In FIG. 1, UE (User Equipment) 101 and 102 are portable terminals.

S-GW (Serving-Gateways) 108, 111, and 117 are devices that transmit user data (U (User)-plane) in a core network.

P-GW (PDN-Gateway, PDN: Packet Data Network) 107, 112, and 119 are devices having an interface with an EPC (Evolved Packet Core), an IMS (IP Multimedia Subsystem), or an outside packet network (for example, outside networks such as Internet 106, 113, and 120).

MME (Mobility Management Entity) 115 is a core network device that performs signal control and mobility management of UEs 101 and 102 in a core network and selects the paths of user data (i.e., S-GW and P-GW) with UEs 101 and 102.

eNB (evolved NodeB) is a base station that performs wireless communication with UE 101.

HeNB (Home eNB) 104 is a base station that carries out wireless communication with UE 102.

HeNB 104 indicates an LTE femtocell base station, and eNB 103 indicates an LTE base station other than a femtocell base station, and may be a picocell base station or a macrocell base station.

Although not shown in FIG. 1, HNB (Home NodeB) indicates a 3G ($3^{rd}$ Generation) femtocell base station, NodeB indicates a 3G base station other than a femtocell base station, and may be a picocell base station or a macrocell base station.

Although not shown in FIG. 1, the following abbreviations are used as appropriate in the present specification.

(H)eNB is assumed to indicate either HeNB or eNB.

H(e)NB is assumed to indicate either HNB or HeNB.

(H)(e)NB is assumed to indicate any of HNB, HeNB, NodeB, and eNB.

HeNB-GW 114 accommodates a plurality of eNB 103 or a plurality of HeNB 104, is a gateway device that connects these devices to a core network, and relays user data and control signals (C (control)-plane) between a core network and HeNB 104 or eNB 103. In addition, HeNB-GW 114 may also accommodate a base station that is equipped with other wireless communication capacities such as WiFi (Wireless Fidelity).

Although not shown in FIG. 1, a gateway device that accommodates a 3G femtocell base station is referred to as HNB-GW.

SeGW (Security Gateways) 109 and 110 establish IPsec tunnels with HeNB 104 and eNB 103 and provide secure communication.

HSS (Home Subscriber Server) 116 holds information for each subscriber that uses UEs 101 and 102 and when there is an inquiry for information relating to a subscriber from MME 115, returns this information.

DNS (Domain Name System) 118 is used when MME 115 selects S-GW or P-GW.

MME 115 uses the DNS mechanism of the related art on the basis of information of the TAC (Tracking Area Code) and RAC (Routing Area Code) of a base station that UEs 101 and 102 are accessing to select S-GW or P-GW that transmits the user data of UEs 101 and 102.

In addition, when unable to select an appropriate S-GW or P-GW by only information of the TAC and RAC, MME 115 takes into consideration information such as the RNC (Radio Network Controller), RNC-ID of the eNB, or eNB-ID that UEs 101 and 102 are accessing and uses the DNS mechanism of the related art to select the S-GW or P-GW that transmits the user data of UEs 101 and 102.

As described hereinabove, the present system is capable of activating SIPTO above RAN. In SIPTO, user data that were transmitted to the Internet from a UE are assumed to be offloaded at an offload point that is close to the base station that was accessed by the UE.

In FIG. 1, three S-GW 108, 111, and 117 are shown as S-GW.

Of these S-GW, S-GW 117 is a node in the core network and is used when SIPTO is not activated.

S-GW 108 is an S-GW for offloading that is selected as the offload point when SIPTO is activated and is the S-GW that is geographically/or network-topologically closest as seen from eNB 103 when SIPTO is activated under the condition in which UE 101 is accessing eNB 103.

S-GW 111 is the S-GW for offloading that is selected as the offload point when SIPTO is activated and is the S-GW that is geographically/network-topologically closest as seen from HeNB 104 when SIPTO is activated under the condition in which UE 102 is accessing HeNB 104.

In FIG. 1, three P-GW 107, 112, and 119 are shown as P-GW.

Of these P-GW, P-GW 119 is a node in the core network and is used when SIPTO is not activated.

P-GW 107 is a P-GW for offloading that is selected as the offload point when SIPTO is activated and is the P-GW that is geographically/network-topologically closest as seen from eNB 103 when SIPTO is activated under the condition in which UE 101 is accessing eNB 103.

P-GW is a P-GW for offloading that is selected as the offload point when SIPTO is activated and is the P-GW that is geographically/network-topologically closest as seen from HeNB 104 when SIPTO is activated under the condition in which UE 102 is accessing HeNB 104.

SeGW 109 and 110 may be installed in the core network, or may be installed in Backhaul Network 105. No particular limitation applies to the installation locations of SeGW 109 and 110.

Similarly, HeNB-GW 114 may be installed in the core network or may be installed in Backhaul Network 105. No particular limitations apply to the installation location of HeNB-GW 114.

Similarly, S-GW 108 and 111 and P-GW 107 and 112 for offloading may be installed in the core network or may be installed in Backhaul Network 105. In addition, the functions of S-GW and P-GW for offloading may be provided in HeNB 104 and eNB 103. No particular limitations apply to the installation locations of S-GW 108 and 111 or P-GW 107 and 112 for offloading.

HeNB-GW 114 is next described in detail.

A gateway device that accommodates a base station that forms small cells is referred to as a small-cell gateway. HeNB-GW 114 is here described as a small-cell gateway that accommodates a plurality of HeNB 104.

Installing HeNB-GW 114 as a small-cell gateway enables not only line concentration of the C-plane of the S1 interface (abbreviated as S1-C) with MME 115 as shown in the related art (3GPP TS36.300 Ver11.5.0, 3GPP: 3$^{rd}$ Generation Partnership Project) but also enables line concentration of the U-plane of the S1 interface (abbreviated as S1-U) with S-GW 117.

Regarding the C-plane, MME 115 carries out transmission and reception of a HEARTBEAT signal of SCTP (Stream Control Transmission Protocol) in order to monitor the state of the link on the S1 interface. However, the bundling of a plurality of HeNB 104 by HeNB-GW 114 eliminates the need for MME 115 to transmit and receive the HEARTBEAT signal with each HeNB 104, and MME 115 need only transmit and receive the HEARTBEAT signal with HeNB-GW 114. In other words, HeNB-GW 114 monitors the state of links by transmitting and receiving the SCTP HEARTBEAT signal with each HeNB 104, whereby the signal load of MME 115 can be reduced.

Regarding the U-plane on the other hand, S-GW 117 monitors the normalcy of the path of GTP-U by an ECHO procedure of the GTP-U (GPRS Tunneling Protocol-User where GPRS is General Packet Radio Service) protocol. However, the bundling of a plurality of HeNB 104 by HeNB-GW 114 eliminates the need for S-GW 117 to implement the ECHO procedure with each HeNB 104, and S-GW 117 need only implement the ECHO procedure with HeNB-GW 114. In other words, HeNB-GW 114 monitors the state of the U-plane by implementing the ECHO procedure with each HeNB 104, and as a result, the signal load upon S-GW 117 can be reduced.

In the core network, moreover, IP addresses have already been assigned to apparatuses in the core network. When a large number (on the order of, for example, several 100,000) of HeNB 104 are subsequently introduced, the possibility arises that in some cases restructuring such as the re-assignment of IP addresses will become necessary due to the limitation of IP addresses that can be assigned by the provider.

However, installation of HeNB-GW 114 between HeNB 104 and the core network enables the user data and control signals that are transmitted by way of HeNB-GW 114 to be first terminated at HeNB-GW 114 and allows the addresses to be replaced by the address of HeNB-GW 114. In this way, only the IP address of HeNB-GW 114 need be prepared in the core network and the independence of the IP address space between the core network and HeNB 104 can be maintained. In this way, the existence of HeNB-GW 114 allows the easy introduction of HeNB 104 without any influence upon the setting of IP addresses of the core network. HeNB-GW 114 therefore realizes a concentration function for a large number of HeNB 104.

In addition, because it is assumed that HeNB 104 will be installed in residences and businesses, it is also assumed that the power will be more frequently turned ON and OFF than in a macrocell base station. If HeNB-GW 114 is not present at such times, many alarms will be raised in MME 115 and S-GW 117 when the power of HeNB 104 is turned OFF due to faults of SCTP links between MME 115 and HeNB 104 and faults of the U-plane between S-GW 117 and HeNB 104. However, if HeNB-GW 114 is present, there will be no effect upon SCTP links with the MME 115 side or upon the U-plane with the S-GW 117 side even when HeNB 104 is turned OFF, and alarms will therefore not occur.

Thus, HeNB-GW 114 becomes necessary in a state in which a large number of HeNB 104 are installed both to reduce the signal load upon MME 115 and S-GW 117 and to eliminate alarms to MME 115 and S-GW 117 when turning OFF power to HeNB 104.

LITERATURE OF THE PRIOR ART

Non-Patent Documents

Non-Patent Document 1: 3GPP TS36.300 Ver 11.5.0
Non-Patent Document 2: 3GPP TS23.401 Ver 12.1.0
Non-Patent Document 3: 3GPP TS 29.303 Ver 12.0.0
Non-Patent Document 4: 3GPP TS 36.413 Ver 11.4.0
Non-Patent Document 5: 3GPP TS 32.782 Ver 11.0.0
Non-Patent Document 6: 3GPP TS 32.752 Ver 11.0.1
Non-Patent Document 7: 3GPP TS 36.932 Ver 12.0.0
Non-Patent Document 8: 3GPP TS 23.060 Ver 12.1.0
Non-Patent Document 9: 3GPP TS 25.413 Ver 11.4.0
Non-Patent Document 10: 3GPP TS 32.642 Ver 11.4.0

SUMMARY OF THE INVENTION

Problem to be Solved by the Invention

As described hereinabove, recent years have seen the popularization of the small-cell solution in which the size of the cell radius of the base stations is reduced as a countermeasure to the rapid increase of user traffic. In addition, linked technology of mobile communication networks and wireless LAN (Local Area Networks) such as Hotspot 2.0 are also becoming widespread.

Technology such as the above-described small-cell solution is a countermeasure on wireless lines, but cable lines also have the problem in which the line cost of a Backhaul Network and the apparatus costs of packet network products (such as S-GW and P-GW) increase due to the rapid increase of user traffic. As a countermeasure to this problem, the above-described SIPTO technology has been established as a technique for detouring and directing user data of an MNO (Mobile Network Operator) to the Internet in 3GPP.

The SIPTO modes that are prescribed in 3GPP can be broadly divided into the following three modes.

Mode 1: A mode of offloading at a node above RAN (SIPTO above RAN) (see the description in section 4.3.15 of 3GPP TS23.401 Ver 12.1.0)

Mode 2: A mode of offloading at a stand-alone GW that is provided with the S-GW and L-GW (Local-Gateway) functions in a local network (refer to "SIPTO at the Local Network with stand-alone GW (with S-GW and L-GW collocated) function" of section 4.3.15a.2 of 3GPP TS23.401 Ver 12.1.0)

Mode 3: A mode of offloading at H(e)NB that is provided with the L-GW functions at the Local Network (see "SIPTO at the Local Network with L-GW function collocated with the (H)eNB" in section 4.3.15a.3 of 3GPP TS 23.401 Ver 12.1.0)

SIPTO modes 1-3 are described in detail below.

(1) Mode 1: Mode of Offloading Above RAN (SIPTO Above RAN)

Mode 1 is described with reference to FIG. 1.

In this mode 1, offloading is to a node above RAN (corresponding to, for example, a network that includes eNB 103 and HeNB 104 in FIG. 1).

In the related art (3GPP TS 23.401 Ver 12.1.0), the operator can set in HSS 116 subscription data that indicates whether the activation of SIPTO is permitted for each user, and moreover, whether it is permitted for each APN (Access Point Name). On the basis of this subscription data, HSS 116 is able to instruct MME 115 whether the activation of SIPTO is permitted.

Permission information as to whether the activation of SIPTO is permitted can be set in MME 115 for each APN so as to allow dealing with a case in which subscription data relating to the permission to activate SIPTO are not set in HSS 116. SIPTO is not activated when there is a conflict between the settings of MME 115 and subscription data from HSS 116 relating to the permission of SIPTO.

In this way, MME 115 determines whether to activate SIPTO according to subscription data for each user, and moreover, for each APN in HSS 116 and permission information for each APN in MME 115.

When activating SIPTO, MME 115 depends on the network settings of the operator, but using TAI (Tracking Area Identity), eNodeB-ID, or both of TAI and eNodeB-ID, uses DNS 118 to select the S-GW and P-GW (Shown in 3GPP TS 29.303 Ver 12.0.0 in the related art).

Nevertheless, neither HeNB-GW 114 nor HeNB 104 is notified by S1AP protocol as to whether MME 115 has activated SIPTO in the related art (3GPP TS 36.413 Ver 11.4.0).

FIGS. 2-5 show examples of the parameters of each message in the related art (3GPP TS 36.413 Ver 11.4.0). FIG. 2 shows the parameters of an E-RAB (E-UTRAN Radio Access Bearer, where E-UTRAN is Evolved Universal Terrestrial Radio Access Network) SETUP REQUEST message; FIG. 3 shows the parameters of an INITIAL CONTEXT SETUP REQUEST message, FIG. 4 shows the parameters of a HANDOVER REQUEST message, and FIG. 5 shows the parameters of a PATH SWITCH REQUEST ACKNOWLEDGE message. In FIG. 2, there is a parameter called the Correlation ID, but this parameter is a parameter that is set only when L-GW is the same device as HeNB (i.e., L-GW is collocated with HeNB) in LIPA (Local IP Access) or "SIPTO at the Local Network," and this parameter is not applied in the case of SIPTO above RAN.

As can be understood from FIGS. 2-5, neither HeNB-GW 114 nor HeNB 104 is notified by S1AP protocol as to whether "SIPTO above RAN" has been activated.

Accordingly, HeNB-GW 114 cannot know whether or not SIPTO has been activated in the case of SIPTO above RAN.

In the related art (Attributes and relationships of 3GPP TS 32.782 Ver 11.0.0 and 3GPP TS 32.752 Ver 11.0.1) HeNB-GW 114 holds IP addresses of MME 115 and S-GW 108, 111, and 117. However, HeNB-GW 114 does not hold information that distinguishes whether S-GW 108, 111, and 117 has been selected as the offload points at the time SIPTO above RAN is activated or are used on the core network side without being selected at the time SIPTO above RAN is activated.

Accordingly, HeNB-GW 114 is unable to determine by only the information of the TRANSPORT LAYER Address in a S1AP message reported from MME 115 whether the S-GW indicated in that information is the S-GW selected at the time of activating SIPTO above RAN.

On the other hand, HeNB-GW 114 is made to accommodate a large number of HeNB 104. HeNB-GW 114 terminates the U-plane, i.e., relays user data of the GTP-U protocol. In this case, upon having received an E-RAB Setup Request message (to be described), HeNB-GW 114 must replace the IP address of this E-RAB Setup Request message and the GTP-U TEID (Tunnel Endpoint ID) with the TEID and IP address of HeNB-GW 114 itself.

FIG. 6 shows a sequence when E-RAB is established in the related art (UE requested PDN connectivity of section 5.10.2 of 3GPP TS 23.401 Ver 12.1.0).

Step A1: When requesting a new PDN connection, UE 102 transmits a PDN Connectivity Request message to MME 115.

Step A2: In accordance with the related art (UE requested PDN connectivity of section 5.10.2 of 3GPP TS 23.401 Ver 12.1.0) MME 115 supplements the TEID resources of S-GW 117 and P-GW 119 for the bearer of a new PDN connection and transmits an E-RAB SETUP REQUEST message, which is a message requesting the establishment of E-RAB, to HeNB-GW 114.

Step A3: Upon receiving the E-RAB Setup Request message from MME 115, HeNB-GW 114 assigns TEID, which is the address of uplink user data from HeNB 104, for each E-RAB. In addition, HeNB-GW 114 uses its own TEID and IP address to construct an E-RAB Setup Request message requesting the establishment of E-RAB and transmits the E-RAB Setup Request message to HeNB 104.

Step A4: When having received an E-RAB Setup Request message from HeNB-GW 114, HeNB 104 assigns appropriate wireless resources for the new bearer, carries out settings, and transmits an RRC Connection Reconfiguration message to UE 102.

Step A5: UE 102 carries out settings for the new bearer in accordance with the instruction of HeNB 104 and transmits an RRC Connection Reconfiguration Complete message to HeNB 104.

Step A6: When HeNB 104 receives the RRC Connection Reconfiguration Complete message from UE 102, HeNB 104 transmits an E-RAB Setup Response message to HeNB-GW 114.

Step A7: HeNB-GW 114, having received the E-RAB Setup Response message from HeNB 104, assigns for each E-RAB TEID that is the address of downlink user data from S-GW 117. In addition, HeNB-GW 114 replaces the TEID in the E-RAB Setup Response message that is the response message to the E-RAB Setup Request message that is transmitted to MME 115 with the TEID of HeNB-GW 114 itself. Further, at this time, the Transport Layer Address of the E-RAB Setup Response message from HeNB 104 is set to the IP address of HeNB 104. As a result, HeNB-GW 114 replaces the Transport Layer Address of the E-RAB Setup Response message that is to be transmitted to MME 115 with the IP address of HeNB-GW 114 itself such that the user data are transferred to HeNB-GW 114.

By means of the above-described operation, user data are reliably transmitted and received by way of HeNB-GW 114 in the related art as shown in FIG. 7. Because U-plane relay is thus carried out by way of HeNB-GW 114, this function is also referred to as the U-plane relay function (or termination function). In the U-plane relay function, user data of the U-plane from HeNB 104 are first terminated in HeNB-GW 114, and a protocol message of the U-plane is transmitted to MME 115. Conversely, protocol messages of the U-plane from MME 115 are first terminated at HeNB-GW 114 and protocol messages of the U-plane are transmitted to HeNB 104. HeNB-GW 114 does not carry out the concentration function for HeNB 104.

In a case in which the U-plane relay function is not activated, U-plane protocol messages are transmitted to MME 115 without terminating the U-plane user data from HeNB 104 in HeNB-GW 114. Conversely, U-plane protocol messages are transmitted to HeNB 104 without terminating the U-plane protocol messages from MME 115 in HeNB-GW 114. HeNB-GW 114 does not carry out the concentration function for HeNB 104.

A problem is next described for a case in which, in the present Mode 1, the U-plane relay function of HeNB-GW 114 is activated in a state in which SIPTO is activated.

The above-described operation sequence itself is similar to FIG. 6, and explanation regarding the above-described operation next focuses on the differences with the operation that was described using FIG. 6.

Step A2: MME 115 takes into consideration the subscription data that were set in HSS 116 and the permission information that was set in MME 115 and finally determines whether to activate SIPTO above RAN. When MME 115 activates SIPTO above RAN, MME 115, using either TAI or eNodeB-ID or both TAI and eNodeB-ID to which HeNB 104 belongs that serves the area in which UE 102 is located, uses DNS 118 to select P-GW 112 and S-GW 111, as shown in the related art (sections 4.3.8.1 and 4.3.8.2 of 3GPP TS 23.401 Ver 12.1.0).

In accordance with the related art (UE requested PDN connectivity of section 5.10.2 of 3GPP TS 23.401 Ver 12.1.0), MME 115 supplements the resources of TEID of S-GW 111 and P-GW 112 for the bearer of a new PDN connection and transmits an E-RAB SETUP REQUEST message to HeNB-GW 114.

Step A3: HeNB-GW 114, having received the E-RAB Setup Request message from MME 15, is unable to determine whether SIPTO above RAN has been activated. Accordingly, HeNB-GW 114 assigns TEID, which is the address of uplink user data from HeNB 104, for each E-RAB, such as in a case in which SIPTO above RAN has not been activated. In addition, HeNB-GW 114, using the TEID and IP address of HeNB-GW 114 itself, constructs an E-RAB Setup Request message requesting the establishment of E-RAB and transmits the E-RAB Setup Request message to HeNB 104.

Step A7: HeNB-GW 114, having received the E-RAB Setup Response message from HeNB 104, assigns TEID, which is the address of downlink user data from S-GW 111, for each E-RAB. In addition, HeNB-GW 114 replaces the TEID with the TEID of HeNB-GW 114 itself in the E-RAB Setup Response message to be transmitted to MME 115. At this time, a Transport Layer Address of the E-RAB Setup Response message from HeNB 104 is set to the IP address of HeNB 104. As a result, HeNB-GW 114 replaces the Transport layer Address of the E-RAB Setup Response message to be transmitted to MME 115 with the IP address of HeNB-GW 114 itself so that the user data are transferred to HeNB-GW 114.

As a result, a bearer such as in FIG. 8 is established.

In FIG. 8, when MME 115 activates SIPTO above RAN, MME 115 selects S-GW 111/P-GW 112 that are geographically/network-topologically close to HeNB 104 that UE 102 is accessing. However, because the U-plane relay function of HeNB-GW 114 has been activated, the user data end up being transmitted by way of HeNB-GW 114. As a result, despite the activation of SIPTO above RAN, the problem arises in which the user data cannot be transmitted directly from HeNB 104 to S-GW 111/P-GW 112. This results in a signal delay in the portion of transmission by way of HeNB-GW 114, an increase in the line cost of Backhaul Network 105, and a problem in which the capacity of HeNB-GW 114 is increased.

Thus, in the related art, HeNB-GW 114 is unable to determine whether SIPTO above RAN is activated at the time of receiving an E-RAB Setup Request message, with the result that the U-plane relay function is activated even when SIPTO above RAN has been activated, giving rise to the problem in which the benefits of SIPTO above RAN are lost.

Conversely, when HeNB-GW 114 consistently does not activate the U-plane relay function, the U-plane line concentration function of HeNB-GW 114 is lost, giving rise to the problems in which the signal load increases due to the increase of the objects of monitoring on the S-GW 117 side, GTP-U path faults on the S-GW 117 side are detected when HeNB 104 turns ON/OFF, alarms are raised.

Similar problems also occur in a case in which not only HeNB 104 but also eNB 103 are connected to a concentration device such as HeNB-GW 114, and SIPTO above RAN is activated to cause activation of the U-plane relay function in the concentration device.

In addition, similar problems also occur in the case of an LTE relay system, i.e., when in-house gateways are used to accommodate HeNB 104 and these in-house gateways are accommodated in HeNB-GW 114, in the case of 3G, and also in the case of small-cell enhancement.

(2) Mode 2: A Mode of Offloading to a Stand-Alone GW that is Equipped with the S-GW and L-GW Functions in a Local Network (SIPTO at the Local Network with Stand-Alone GW (with S-GW and L-GW Collocated) Function)

FIG. 9 shows an outline of the configuration of an LTE mobile communication system that can activate SIPTO at the Local Network.

The system configuration of FIG. 9 is next described while focusing on the differences with FIG. 1.

L-GW 907 is a different device from HeNB 903.

HeNB 904 is equipped with the functions of L-GW 905.

The present Mode 2 implements offloading of user data to Internet 106 in L-GW 907 that is a different device from HeNB 903. L-GW 907 in this case is equipped with the functions of both S-GW and P-GW.

L-GW 907 may be installed in the local network or may be installed in Backhaul Network 105. HeNB 904 is further equipped with the functions of L-GW 905 for offloading, but the functions of L-GW for offloading may also be equipped in, for example, eNB and HeNB-GW. No particular limitations apply to the installation locations of L-GW 905 and 907.

The explanation next deals with problems that arise in the present Mode 2 when the U-plane relay function of HeNB-GW 114 is activated in a state in which SIPTO has been activated.

The sequence itself of the above-described operation is similar to FIG. 6, and the above-described operation is next described with focus upon the differences with the operation described using FIG. 6.

Step A2: MME 115 takes into consideration the subscription data that were set in HSS 116 and the permission information that was set in MME 115 to determine whether to activate SIPTO at the Local Network. When SIPTO at the Local Network is activated, MME 115, using APN, and further, the Local Home Network ID of HeNB 903 that serves the area in which UE 101 is located, uses DNS 118 to select L-GW as shown in the related art (sections 4.3.8.1 and 4.3.8.2 of 3GPP TS 23.401 Ver 12.1.0). The local home network ID is reported to MME 115 from HeNB 903 by means of an INITIAL UE message and an UPLINK NAS TRANSPORT message. MME 115 uses the local home network ID to detect whether UE 101 has moved away from the local network and determines whether the L-GW is to be moved.

In accordance with the related art (UE requested PDN connectivity of section 5.10.2 in 3GPP TS 23.401 Ver 12.1.0), MME 115 supplements the resources of TEID of L-GW 907 for the bearer of the new PDN connection and transmits an E-RAB SETUP REQUEST message to HeNB-GW 114.

Step A3: HeNB-GW 114, having received the E-RAB Setup Request message from MME 115, is unable to determine whether SIPTO at the Local Network has been activated.

Further, there is no indication in the related art as to whether the HeNB-GW has information relating to L-GW (in Attributes and relationships in 6.2.1 of 3GPP TS 32.782 Ver 11.0.0 and 3GPP TS 32.752 Ver 11.0.1).

Accordingly, HeNB-GW 114 is unable to determine from only the information of the Transport Layer Address that is reported from MME 115 by an S1AP message whether the GW indicated by this information is L-GW that is selected at the time of activation of SIPTO at the Local Network or is S-GW that is located in the core network.

Accordingly, HeNB-GW 114 assigns, for each E-RAB, TEID, which is the address of the uplink user data from HeNB 903, similar to a case in which SIPTO at the Local Network has not been activated. In addition, HeNB-GW 114 uses the TEID and IP address of HeNB-GW 114 itself to construct an E-RAB Setup Request message requesting establishment of E-RAB and transmits the E-RAB Setup Request message to HeNB 903.

Step A7: HeNB-GW 114, having received the E-RAB Setup Response message from HeNB 903, assigns, for each E-RAB, TEID that is the address of the downlink user data from L-GW 907. HeNB-GW 114 further replaces the TEID in the E-RAB Setup Response message that is to be transmitted to MME 115 with the TEID of HeNB-GW 114 itself. At this time, the Transport Layer Address of the E-RAB Setup Response message from HeNB 903 is set to the IP address of HeNB 903. As a result, HeNB-GW 114 replaces the Transport layer Address of the E-RAB Setup Response message that is to be transmitted to MME 115 with the IP address of HeNB-GW 114 itself so that the user data will be transferred to HeNB-GW 114.

As a result, a bearer such as shown in FIG. 10 is established.

In FIG. 10, when MME 115 activates SIPTO at the Local Network, MME 115 selects L-GW 907 that is geographically/network-topologically close to HeNB 903 that UE 101 accesses. However, because the U-plane relay function of HeNB-GW 114 is activated, the user data ends up being transmitted by way of HeNB-GW 114. As a result, the user data cannot be directly transmitted to L-GW 907 from HeNB 903 despite the activation of SIPTO at the Local Network. This results in a signal delay in the portion of the transmission by way of HeNB-GW 114, an increase in the line cost of Backhaul Network 105, and a problem in which the capacity of HeNB-GW 114 is increased.

Thus, in the related art, HeNB-GW 114 is unable to determine whether SIPTO at the Local Network has been activated at the time of receiving an E-RAB Setup Request message, and as a result, the problem arises in which the U-plane relay function is activated even when SIPTO at the Local Network has been activated, causing the benefits of SIPTO at the Local Network to be lost.

(3) Mode 3: A Mode of Offloading at H(e)NB Equipped with the L-GW Function at the Local Network (SIPTO at the Local Network with the (H)eNB)

The present Mode 3 is described with reference to FIG. 9.

The present Mode 3 implements offloading of user data to Internet 113 at HeNB 904 that is equipped with the functions of L-GW 905. In this case, L-GW 905 is equipped with P-GW functions, and at the time of offloading, realizes offloading of user data by establishing a direct tunnel between HeNB 904 and L-GW 905 (without being transmitted by way of S-GW).

In this case, as shown in FIG. 11, a direct tunnel is established between HeNB 904 and L-GW 905 regardless of whether the U-plane relay function has been activated in HeNB-GW 114. As a result, the problem does not arise in which the user data ends up being transmitted by way of HeNB-GW 114 with the consequent loss of the benefits of SIPTO.

As described above, because HeNB-GW 114 is unable to learn whether SIPTO has been activated in the related art, the above-described problems occur in the cases of Mode 1 and Mode 2.

It is therefore an object of the present invention to provide a technology that can provide a solution to the above-described problems.

Means for Solving the Problem

The mobile communication system of the present invention is a mobile communication system that has: a portable terminal; a base station that performs wireless communication with the portable terminal; a gateway device that connects the base station to a core network; and a core network device that is installed in the core network and that performs mobility management of the portable terminal, wherein:

the core network device transmits to the gateway device information for determining whether SIPTO has been activated; and the gateway device receives the information from the core network device.

The gateway device of the present invention is a gateway device that connects a base station to a core network; comprising:

a communication unit that receives information for determining whether SIPTO has been activated from a core network device that is installed in the core network.

The core network device of the present invention is a core network device that is installed in a core network and that performs mobility management of a portable terminal, comprising:

a communication unit that transmits to a gateway device information for determining whether SIPTO has been activated.

The first communication method of the present invention is a communication method realized by a gateway device that connects a base station to a core network, comprising a step of:

receiving information for determining whether SIPTO has been activated from a core network device that is installed in said core network.

The second communication method of the present invention is a communication method realized by a core network device that is installed in a core network and that performs mobility management of a portable terminal, comprising a step of:

transmitting information for determining whether SIPTO has been activated to a gateway device.

Effect of the Invention

The present invention obtains the effect of enabling a gateway device to learn that SIPTO is activated.

BRIEF DESCRIPTION OF THE DRAWINGS

FIG. 1 shows the configuration of an LTE mobile communication system in which SIPTO above RAN can be activated.

FIG. 2 shows the parameters of an E-RAB SETUP REQUEST message in the related art.

FIG. 3 shows the parameters of an INITIAL CONTEXT SETUP REQUEST message in the related art.

FIG. 4 shows the parameters of a HANDOVER REQUEST message in the related art.

FIG. 5 shows the parameters of a PATH SWITCH REQUEST ACKNOWLEDGE message in the related art.

FIG. 6 is a sequence diagram of an E-RAB establishment operation in the related art.

FIG. 7 shows the U-plane transmission path in a case in which SIPTO above RAN has not been activated in the related art.

FIG. 8 shows the U-plane transmission path in a case in which SIPTO above RAN has been activated in the related art.

FIG. 9 shows the configuration of an LTE mobile communication system in which SIPTO at the Local Network can be activated.

FIG. 10 shows the U-plane transmission path in a case in which SIPTO at the Local Network (offloading at L-GW that is equipped with S-GW/P-GW functions) has been activated in the related art.

FIG. 11 shows the U-plane transmission path in a case in which SIPTO at the Local Network (offloading at HeNB that is equipped with L-GW functions) has been activated in the related art.

FIG. 12 shows the parameters of an E-RAB SETUP REQUEST message of the first exemplary embodiment of the present invention.

FIG. 13 shows the configuration of a SIPTO above RAN activation status flag in the first and second exemplary embodiments of the present invention.

FIG. 17 shows the configuration of a 3G mobile communication system in which SIPTO above RAN can be activated.

FIG. 18 is a sequence diagram showing the RAB establishment operation in the second exemplary embodiment of the present invention.

FIG. 19 shows the parameters of an E-RAB SETUP REQUEST message in the third exemplary embodiment of the present invention.

FIG. 20 shows the configuration of a SIPTO at the Local Network activation status flag in the third and fourth exemplary embodiments of the present invention.

BEST MODE FOR CARRYING OUT THE INVENTION

Exemplary embodiments of the present invention are next described with reference to the accompanying drawings.

(1) First Exemplary Embodiment
(1-1) Configuration of the First Exemplary Embodiment The present exemplary embodiment is an exemplary embodiment in which SIPTO above RAN has been activated in an LTE mobile communication system, the system configuration itself being similar to FIG. 1.

In the present exemplary embodiment, MME 115 sets for each E-RAB a parameter (SIPTO above RAN activation status flag) indicating whether SIPTO above RAN has been activated in a message requesting the establishment of E-RAB (for example, an E-RAB Setup Request message, an Initial Context Setup Request message, a Handover Request message, a Path Switch Request Acknowledgement message, an E-RAB Modify Request message, or a UE Context Modification Request message) and transmits the message to HeNB-GW 114.

HeNB-GW 114 holds activation determination flags for determining whether to activate a U-plane relay function for E-RAB in which SIPTO above RAN has been activated. An activation determination flag indicates either "activation possible" or "activation not possible" and is set in advance.

HeNB-GW 114 determines whether or not to activate the U-plane relay function based on the SIPTO above RAN activation status flag that is reported from MME 115 and the activation determination flag of the U-plane relay function belonging to HeNB-GW 114 itself.

FIG. 12 shows an example of the parameters of an E-RAB SETUP REQUEST message according to the present exemplary embodiment. Compared to FIG. 2, the SIPTO above RAN activation status flag is newly introduced.

FIG. 13 shows the configuration of a SIPTO above RAN activation status flag.

The SIPTO above RAN activation status flag is a newly introduced flag.

MME 115 sets a SIPTO above RAN activation status flag when MME 115 activates SIPTO above RAN for an object E-RAB, and does not set the SIPTO above RAN activation status flag when not activating SIPTO above RAN.

Accordingly, MME 115 is able to report to HeNB-GW 114 that SIPTO above RAN has been activated by means of the SIPTO above RAN activation status flag.

(1-2) Operation of the First Exemplary Embodiment

Figure 14:
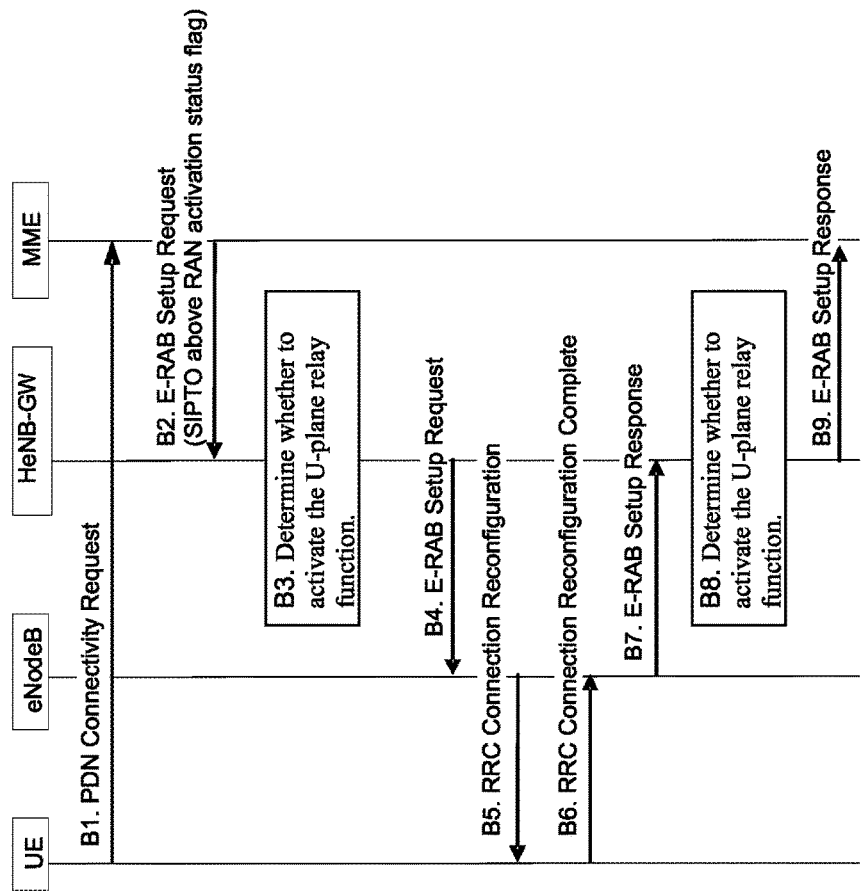
FIG. 14 is a sequence diagram showing the E-RAB establishment operation in the first exemplary embodiment of the present invention.

FIG. 14 shows the sequence for a case of establishing E-RAB in the present exemplary embodiment.

The sequence of FIG. 14 is next described while focusing on the differences with FIG. 6.

Step B1: This step is similar to Step A1 of FIG. 6.

Step B2: As in the related art, MME 115 uses DNS 118 to select P-GW 112 and S-GW 111. In addition, in accordance with the related art ("UE requested PDN connectivity" of section 5.10.2 in 3GPP TS 23.401 Ver 12.1.0), MME 115 supplements the resources of TEID of S-GW 111 and P-GW 112 as in the related art for the bearer of the new PDN connection and transmits an E-RAB SETUP REQUEST message to HeNB-GW 114. In the present exemplary embodiment, MME 115 here sets the SIPTO above RAN activation status flag shown in FIG. 13 in the E-RAB SETUP REQUEST message to report to HeNB-GW 114 that SIPTO above RAN has been activated.

Step B3: When HeNB-GW 114 receives an E-RAB Setup Request message from MME 115, HeNB-GW 114 is able to learn from the SIPTO above RAN activation status flag whether SIPTO above RAN has been activated.

In addition, HeNB-GW 114 itself holds, as station data (that can be set by an operator in an O&M (Operation & Maintenance) server), an activation determination flag for determining whether the U-plane relay function is to be activated in the case of SIPTO above RAN.

As a result, HeNB-GW 114 determines whether or not to activate the U-plane relay function based on the SIPTO above RAN activation status flag that is reported from MME 115 and the activation determination flag of the U-plane relay function that is held by HeNB-GW 114 itself.

Figure 15:
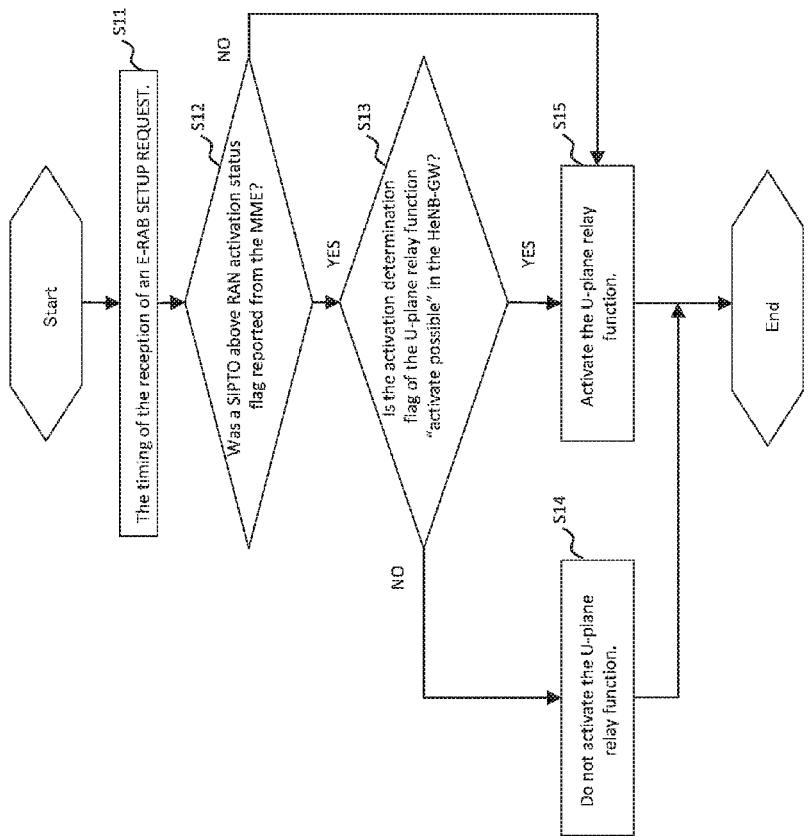
FIG. 15 is a flow chart showing the operation of determining whether to activate the U-plane relay function in the first and second exemplary embodiments of the present invention.

FIG. 15 shows the flow of the processes for determining whether the U-plane relay function is to be activated in Step B3.

Step S11: HeNB-GW 114 receives an E-RAB Setup Request message from MME 115.

Step S12: HeNB-GW 114 determines at the time of receiving the E-RAB Setup Request message whether the SIPTO above RAN activation status flag has been reported from MME 115. If reported, the procedure advances to the process of Step S13, and if not reported, the procedure advances to the process of Step S15.

Step S13: If the SIPTO above RAN activation status flag was reported from MME 115 in Step S12, HeNB-GW 114 determines whether the activation determination flag is "activation possible." If the activation determination flag is "activation possible," HeNB-GW 114 advances to the process of Step S15, and if the flag is "activation not possible," HeNB-GW 114 advances to the process of Step S14.

Step S14: If the activation determination flag is "activation not possible" in Step S13, HeNB-GW 114 determines that S-GW 111/P-GW 112 that is the offload point is below HeNB-GW 114, i.e., on the HeNB 104 side as seen from HeNB-GW 114 and determines not to activate the U-plane relay function.

Step S15: If the SIPTO above RAN activation status flag has not been reported from MME 115 in Step S12, HeNB-GW 114 determines that the U-plane relay function is to be activated, as in the related art.

Further, if the activation determination flag is "activation possible" in Step S13, HeNB-GW 114 determines that S-GW 111/P-GW 112 that is the offload point is above HeNB-GW 114, i.e., on the opposite side from HeNB 104 as seen from HeNB-GW 114, and determines that the U-plane relay function is to be activated.

Steps B4-B7: These steps are similar to Steps A3-A6 of FIG. 6.

Step B8: If HeNB-GW 114 receives an E-RAB Setup Response message from HeNB 104, HeNB-GW 114 determines whether the U-plane relay function is to be activated in accordance with the activation determination result of the U-plane relay function at the time of receiving the E-RAB Setup Request message of Step B3.

Step B9: This step is similar to Step A7 of FIG. 6.

According to the present exemplary embodiment, HeNB-GW 114 holds an activation determination flag for determining whether the U-plane relay function is to be activated in the case of SIPTO above RAN.

The activation determination flag is set to "activate not possible" when S-GW 111/P-GW 112 that is the offload point is located on the HeNB 104 side as seen from HeNB-GW 114.

As a result, it is possible not to terminate user data in HeNB-GW without activating the U-plane relay function on the HeNB-GW 114 side even when MME 115 has activated SIPTO above RAN and even if the activation of SIPTO above RAN has been reported in an E-RAB SETUP REQUEST message. Essentially, HeNB-GW 114 does not perform the concentration function for HeNB 104.

Accordingly, the transport layer address and TEID that were assigned by S-GW 111 are used for the TEID and the transport layer address of the E-RAB SETUP REQUEST message that is reported to HeNB 104, or the transport layer address and TEID that were assigned by HeNB 104 are used for the transport layer address and TEID that are reported to S-GW 111.

Figure 16:
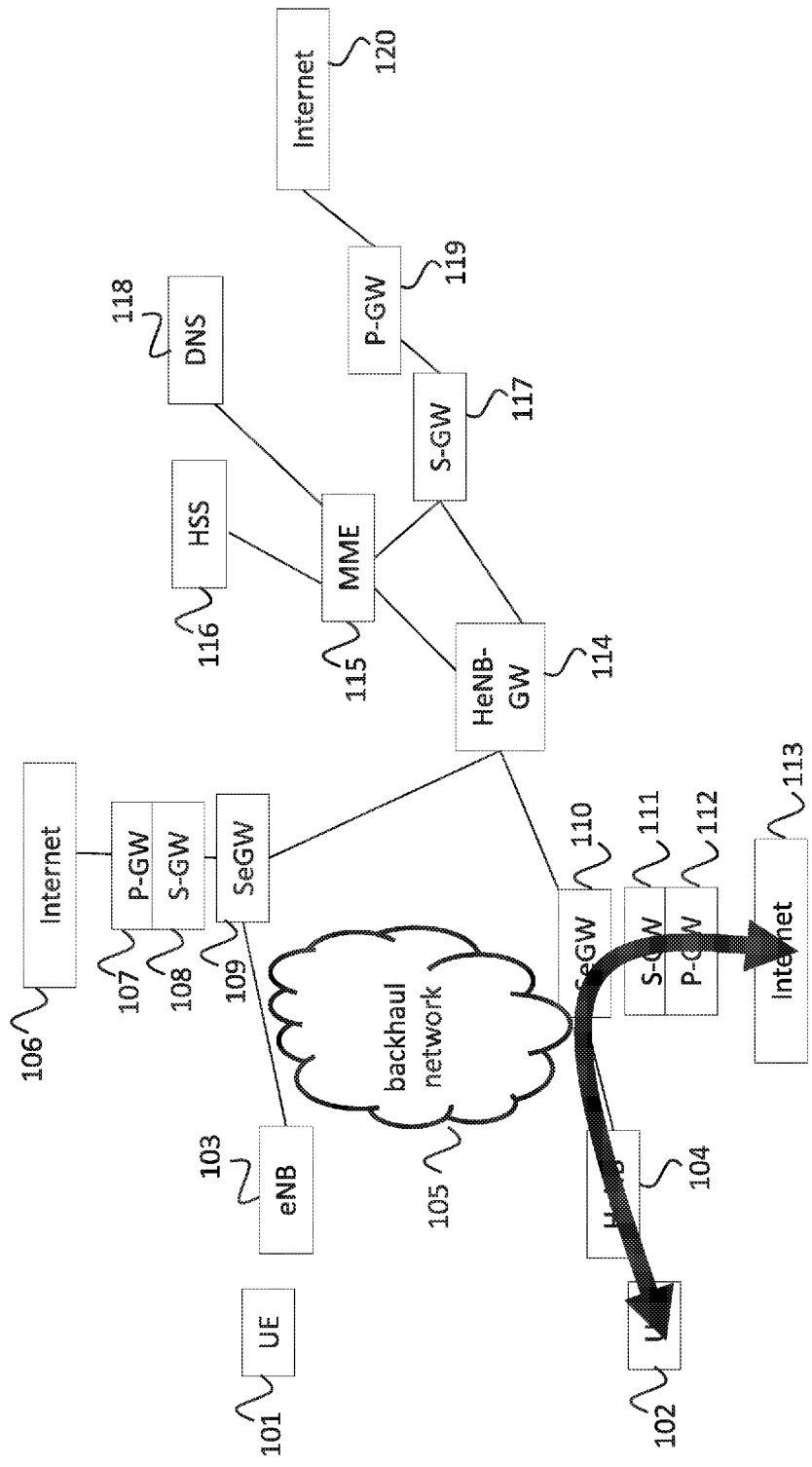
FIG. 16 shows the U-plane transmission path in a case in which SIPTO above RAN has been activated in the first exemplary embodiment of the present invention.

As a result, a bearer is established as in FIG. 16.

From FIG. 16, it can be seen that the user data are directly transmitted to S-GW 111/P-GW 112 without terminating the user data at HeNB-GW 114, whereby the U-plane transmission path is shorter than that of the related art (the case of FIG. 8). As a result, the effects are obtained in which the signal delay caused by transmission by way of HeNB-GW 114 is improved, the line cost of Backhaul Network 105 is decreased, and the problem of the increase of the capacity of HeNB-GW 114 is avoided.

Modifications of the present exemplary embodiment are next described.

The present exemplary embodiment used a procedure of requesting the establishment of an E-RAB by means of an E-RAB SETUP REQUEST message, but the present invention is also applicable to a procedure of requesting establishment of an E-RAB by, for example, different messages such as an INITIAL CONTEXT SETUP REQUEST message, a HANDOVER REQUEST message, or a PATH SWITCH REQUEST ACKNOWLEDGE message. In such cases, MME 115 is able to notify HeNB-GW 114 that SIPTO above RAN has been activated by setting the SIPTO above RAN activation status flag shown in FIG. 13 in these messages in these procedures.

In the related art, the MME is able to activate or halt the SIPTO above RAN by means of an S-GW relocation without UE mobility procedure. For example, because SIPTO is a service that is not permitted when establishing the initial E-RAB, a bearer is established for the user data that are transmitted by way of S-GW 117 and P-GW 119. Afterwards, the MME is able to change the S-GW to S-GW 111 when there is a request to establish a service in which SIPTO is permitted. In this case, a procedure (S-GW relocation without UE mobility procedure) is activated for changing the S-GW without any UE movement. In the present invention, the MME is able to report that SIPTO above RAN has been activated to HeNB-GW 114 by setting the SIPTO above RAN activation status flag shown in FIG. 13 in a message such as an E-RAB Modify Request message or a UE Context Modification Request message.

In addition, in a case in which a service in which SIPTO is permitted is released in the related art, the MME is able to change the S-GW from S-GW 111 to S-GW 117. In the present invention, the MME is able to notify HeNB-GW 114 of the halt of SIPTO above RAN by not setting the SIPTO above RAN activation status flag shown in FIG. 13 in a message such as an E-RAB Modify Request message or a UE Context Modification Request message. In this case, the HeNB-GW is able to recognize that SIPTO above RAN has been halted and is therefore able to determine whether to activate the U-plane relay function.

Although a SIPTO above RAN activation status flag was set in an S1AP (S1 Application Protocol) message requesting the establishment of E-RAB in the present exemplary embodiment, a SIPTO above RAN activation status flag may be set in another S1AP message or may be set in another X2AP (X2 Application Protocol) message or an LPPa (LPP Annex, where LPP: LTE Positioning Protocol) message. In addition, the construction of a SIPTO above RAN activation status flag may use a form other than the form shown in FIG. 13. For example, the construction of the SIPTO above RAN activation status flag may be a construction showing the activation of SIPTO above RAN or the halt of SIPTO above RAN, or may be of another construction.

In addition, although the operation was described regarding the U-plane of HeNB 104 for a case in which SIPTO above RAN has been activated in the present exemplary embodiment, the present invention can also be applied to a case in which SIPTO above RAN has been activated regarding the U-plane of eNB 103. In this case as well, the same effects as described above can be obtained.

Although HeNB-GW 114 was used in the present exemplary embodiment, the present invention is also applicable when applied to an LTE relay system (3GPP TS 36.300 Ver 11.5.0) in place of HeNB-GW 114 and when applying RN (Relay Node) in DeNB (Donor eNB). In these cases, effects similar to those described above can be obtained. In addition, the present invention can also be applied in a small cell enhancement (3GPP TS 36.932 Ver 12.0.0) system in which a macro base station carries out mobility control and a base station that forms a small cell carries out U-plane control. The present invention is also applicable to a case in which the functions corresponding to HeNB-GW 114 are applied in an in-house gateway.

Still further, in the present exemplary embodiment, HeNB-GW 114 itself holds as station data an activation determination flag of the U-plane relay function and is caused to determine whether to activate the U-plane relay function, but HeNB-GW 114 may also determine whether to activate the U-plane relay function without holding station data. For example, if MME 115 activates SIPTO above RAN and the SIPTO above RAN activation status flag is reported by means of an S1AP message, HeNB-GW 114 determines not to activate the U-plane relay function. Alternatively, if MME 115 does not activate SIPTO above RAN and if the SIPTO above RAN activation status flag is not reported by means of an S1AP message, HeNB-GW 114 determines to activate the U-plane relay function.

Although MME 115 notifies HeNB-GW 114 that SIPTO above RAN has been activated in the present exemplary embodiment, HeNB-GW 114 may be notified whether or not SIPTO above RAN has been activated by another method.

For example, HeNB-GW 114 may submit an inquiry to MME 115 regarding whether or not SIPTO above RAN has been activated. In this case, HeNB-GW 114 can determine whether to activate the U-plane relay function on the basis of the response to the inquiry from MME 115 and the U-plane relay function activation determination flag.

Alternatively, the maintenance monitoring device of MME 115 and the maintenance monitoring device of HeNB-GW 114 may communicate with each other, and the maintenance monitoring device of MME 115 may inform the maintenance monitoring device of HeNB-GW 114 that SIPTO above RAN has been activated regarding a relevant E-RAB. In this case, HeNB-GW 114 can determine whether to activate the U-plane relay function on the basis of the notification from the maintenance monitoring device of MME 115 and the activation determination flag of the U-plane relay function.

Alternatively, HeNB-GW 114 may manage, as station data, management information of S-GW IP address and management information of whether a S-GW is an S-GW that has been selected as an offload point by MME 115. HeNB-GW 114, upon receiving a message requesting establishment of an E-RAB from MME 115, may determine that SIPTO above RAN has been activated if the transport layer address of the message matches the IP address of an offload point S-GW that it manages. In this case, HeNB-GW 114 can determine activation of the U-plane relay function on the basis of this determination result and the activation determination flag of the U-plane relay function.

Alternatively, when MME 115 activates SIPTO above RAN, HeNB-GW 114 acquires the IP addresses of S-GW/P-GW that have a possibility of being selected as the offload point in SIPTO above RAN by using the same method as the method of using DNS 118 to select S-GW/P-GW. HeNB-GW 114 may determine that SIPTO above RAN has been activated if these IP addresses are reported in (for example, by a message requesting establishment of an E-RAB) from MME 115. In this case, HeNB-GW 114 is able to determine whether to activate the U-plane relay function on the basis of the determination result and the activation determination flag of the U-plane relay function.

Alternatively, a UE may synchronize with MME 115 and by the same logic predict whether or not MME 115 will activate SIPTO above RAN, and when the UE predicts that SIPTO above RAN is to be activated, the UE may report to HeNB-GW 114 that SIPTO above RAN has been activated by means of an NAS (Non Access Stratum) message for packet call origination. In this case, HeNB-GW 114 is able to determine activation of the U-plane relay function on the basis of the report from the UE and the activation determination flag of the U-plane relay function.

(1-3) Effect of the First Exemplary Embodiment

Due to the configuration described above, this exemplary embodiment obtains effects such as described below.

First Effect: HeNB-GW 114 is able to learn that SIPTO above RAN has been activated. As a result, HeNB-GW 114 can forgo activating the U-plane relay function, thereby enabling optimization of the U-plane transmission path.

Second Effect: Due to the ability to optimize the U-plane transmission path, an improvement of the U-plane transmission delay can be achieved.

Third Effect: The line cost of Backhaul Network 105 between HeNB-GW 114 and S-GW 111 that is the offload point can be decreased. In addition, CAPEX (Capital Expenditure) on the operator side can be decreased.

Fourth Effect: The problem in which offloading of the U-plane to HeNB-GW 114 causes increase of capacity of HeNB-GW 114 can be avoided. The need for increased installation of HeNB-GW 114 is therefore eliminated, and CAPEX on the operator side can be decreased.

(2) Second Exemplary Embodiment (2-1) Configuration of the Second Exemplary Embodiment This exemplary embodiment is an exemplary embodiment in which SIPTO above RAN has been activated in a 3G mobile communication system.

FIG. 17 shows an outline of the configuration of the 3G mobile communication system that can activate SIPTO above RAN.

The system configuration of FIG. 17 is next described with a focus on the differences with FIG. 1.

SGSN (Serving GPRS Support Node; GPRS: General Packet Radio Service) 1715 is a core network device that transmits user data in the core network and that carries out signal control and mobility management of UEs 101 and 102, and further, that carries out setting processes of the paths (i.e., GGSNs 1717, 1707, and 1712) of the user data with UE 101 and 102.

GGSNs (Gateway GPRS Support Nodes) 1707, 1712, and 1717 are nodes having interfaces with outside packet networks (for example, Internet 106, 113, and 120).

HNB 1704 is a base station that carries out wireless communication with UE 102.

RNS (Radio Network Subsystem) 1703 is an integrated base station control device that is integrated with NodeB and RNC and carries out wireless communication with UE 101.

HNB 1704 refers to a 3G femtocell base station, NodeB refers to a 3G base station other than a femtocell base station and may be a picocell base station or a macrocell base station.

HNB-GW 1714 accommodates a plurality of HNB 1704 or a plurality of RNS 1703, is the gateway device that connects these components to the core network, and relays user data and control signals between the core network and HNB 1704 or RNS 1703.

In the relay of user data, the user data from HNB 1704 or RNS 1703 is first terminated in HNB-GW 1714 and then transmitted to SGSN 1715. Conversely, user data from SGSN 1715 is first terminated in HNB-GW 1714 and then transmitted to HNB 1704 or RNS 1703. At the time of relaying user data and control signals, the IP address of HNB can be replaced by the IP address of HNB-GW. In this way, HNB-GW can hold the concentration function for a large number of HNB.

HLR (Home Location Register) 1716 holds information for each subscriber that uses UE 101 and 102 and returns this information when there is an inquiry for information relating to subscribers from SGSN 1715.

DNS 118 is used when SGSN 1715 selects GGSN on the basis of the related art (Annex A of 3GPP TS 23.060 Ver 12.1.0).

In the case of SIPTO above RAN, SGSN 1715 uses the DNS mechanism (NAPTR) of the related art to select the GGSN that transmits the user data of UE 101 and 102 on the basis of information of the RAI (Routing Area Identity) and the RNC (Radio Network Controller)-ID that UE 101 and 102 are accessing.

Three GGSN 1707, 1712, and 1717 are shown as GGSN in FIG. 17.

Of these GGSN, GGSN 1717 is the node that is in the core network and is used when SIPTO is not activated.

GGSN 1707 is a GGSN used for offloading that is selected as the offload point when SIPTO is activated, and when SIPTO is activated in a state in which UE 101 is accessing RNS 1703, GGSN 1707 is the GGSN that is geographically/network-topologically closest as seen from RNS 1703.

GGSN 1712 is a GGSN used for offloading that is selected as the offload point when SIPTO is activated, and when SIPTO is activated in a state in which UE 102 is accessing HNB 1704, GGSN 1712 is the GGSN that is geographically/network-topologically closest as seen from HNB 1704.

HNB-GW 1714 may be installed in the core network and may be installed in Backhaul Network 105. No particular restrictions apply to the installation location of HNB-GW 1714.

Similarly, offloading GGSN 1707 and 1712 may be installed in the core network, or may be installed in Backhaul Network 105. In addition, the functions of the offloading GGSN may be provided with HNB 1704 and RNS 1703. No particular restrictions apply to the installation locations of offloading GGSN 1707 and 1712.

In addition, when SIPTO above RAN is activated, the direct tunnel technology of the related art (3GPP TS 23.060 Ver 12.1.0) is used, and a method is used in which transmission does not take place by way of SGSN 1715.

In the related art, when HNB-GW 1714 does not activate the U-plane relay function, a direct tunnel is established between GGSN 1707 and RNS 1703, and user data from UE 101 can be transmitted directly to Internet 106 by way of RNS 1703, SeGW 109, and GGSN 1707. However, in the related art, HNB-GW 1714 cannot comprehend whether or not SIPTO above RAN has been activated by the RANAP (Radio Access Network Application Part) protocol (3GPP TS 25.413 Ver 11.4.0) when the U-plane relay function is activated.

Parameters such as an Offload RAB Parameters and an MSISDN (Mobile Subscriber ISDN Number, ISDN: Integrated Services Digital Network) parameter can be set in an RANAP RAB Assignment Request message. However, as in the related art (3GPP TS 23.060 Ver 12.2.0 5.3.12.2 and Annex B Selected IP Traffic Offload at 1u-PS), the setting of these parameters is effective only when a TOF (Traffic Offload Function) for implementing offload of user data at a 1u interface is installed and is not effective in cases of SIPTO above RAN and SIPTO at the Local Network.

In other words, HNB-GW 1714 is unable to comprehend whether or not SIPTO above RAN has been activated from a RANAP RAB Assignment Request message in the case of SIPTO above RAN or SIPTO at the Local Network.

In addition, in the related art (3GPP TS 32.642 Ver 11.4.0), HNB-GW 1714 is unable to know whether or not the IP address of the GGSN is the GGSN of the offload point. Accordingly, even if GGSN 1707 and GGSN 1712 are notified by a RANAP message (RAB Assignment Request message or Relocation Request message) that requests establishment of RAB, HNB-GW 1714 is unable to determine whether this is the offload point GGSN and ends up activating the U-plane relay function. As a result, the user data necessarily end up being transmitted by way of HNB-GW 1714 even though SIPTO above RAN has been activated, thus entailing the problems of the signal delay of the portion that is transmitted through HNB-GW 1714, an increase in the line cost of Backhaul Network 105, and an increase of capacity of HNB-GW 1714.

In the present exemplary embodiment, SGSN 1715 sets a parameter (SIPTO above RAN activation status flag) that indicates for each RAB that SIPTO above RAN has been activated in an RAB establishment request message requesting establishment of RAB (for example, an RAB Assignment Request message or a Relocation Request message) and transmits this RAB establishment request message to HNB-GW 1714.

In addition, HNB-GW 1714 holds an activation determination flag for determining whether to activate the U-plane relay function regarding RAB in which SIPTO above RAN has been activated. The activation determination flag indicates "activation possible" or "activation not possible" and is set in advance.

(2-2) Operation of the Second Exemplary Embodiment

FIG. 18 shows the sequence when RAB is established in the present exemplary embodiment.

The sequence of FIG. 18 is next described with focus on the differences with FIG. 14 (LTE of the first exemplary embodiment).

Step C1: UE 102 transmits an Activate PDP (Packet Data Protocol) Context Request message to SGSN 1715.

Step C2: SGSN 1715 uses DNS 118 to select GGSN 1712, as in the related art. In addition, in accordance with the related art (PDP Context Activation Procedure of section 9.2.2 of 3GPP TS 23.060 Ver 12.1.0), SGSN 1715 supplements the resources of TEID of GGSN 1712, as in the related art, to establish a bearer for the new PDP Context and transmits an RAB ASSIGNMENT REQUEST message to HNB-GW 1714. In the present exemplary embodiment, SGSN 1715 here sets the SIPTO above RAN activation status flag shown in FIG. 13 in a RAB ASSIGNMENT REQUEST message to notify HNB-GW 1714 that SIPTO above RAN has been activated.

Step C3: HNB-GW 1714, upon receiving the RAB ASSIGNMENT REQUEST message from SGSN 1715, is able to recognize from the SIPTO above RAN activation status flag whether or not SIPTO above RAN has been activated.

In addition, in the case of SIPTO above RAN, HNB-GW 1714 itself holds, as station data (that can be set by the operator in the O&M server), an activation determination flag for determining whether the U-plane relay function is to be activated.

As a result, HNB-GW 1714 combines the SIPTO above RAN activation status flag that is reported from SGSN 1715 and the activation determination flag that HNB-GW 1714 itself holds to determine whether to activate the U-plane relay function.

At this time, HNB-GW 1714 determines whether to activate the U-plane relay function by the same method as FIG. 15.

In other words, when the SIPTO above RAN activation status flag is not reported from SGSN 1715, HNB-GW 1714 determines to activate the U-plane relay function, as in the related art.

When the SIPTO above RAN activation status flag has been reported from SGSN 1715, HNB-GW 1714 determines that GGSN 1712, that is the offload point, is on the higher-order side of HNB-GW 1714, i.e., that GGSN 1712 is on the side opposite HNB 1704 as seen from HNB-GW 1714 if the activation determination flag is "activation possible," and thus determines to activate the U-plane relay function.

If the SIPTO above RAN activation status flag has been reported from SGSN 1715, HNB-GW 1714 determines that GGSN 1712, that is the offload point, is on the lower-order side of HNB-GW 1714, i.e., that GGSN 1712 is on the side of HNB 1704 as seen from HNB-GW 1714 if the activation determination flag is "activation not possible," and thus determines not to activate the U-plane relay function.

Steps C4-C7: These steps are similar to Steps B4-B7 in FIG. 14.

Step C8: Upon receiving the RAB ASSIGNMENT Response message from HNB 1704, HNB-GW 1714 determines whether to activate the U-plane relay function in accordance with the result of determining activation of the U-plane relay function at the time of receiving the RAB ASSIGNMENT Request message of Step C3.

Step C9: This step is similar to Step B9 of FIG. 14.

According to the present exemplary embodiment, HNB-GW 1714 holds an activation determination flag for determining whether to activate the U-plane relay function in the case of SIPTO above RAN.

The activation determination flag is set to "activate not possible" if GGSN 1712, that is the offload point, is located on the HNB 1704 side as seen from HNB-GW 1714.

It is therefore possible to not terminate user data in HNB-GW 1714 and not activate the U-plane relay function on the HNB-GW 1714 side even when SGSN 1715 has activated SIPTO above RAN and reports that SIPTO above RAN has been activated in an RAB ASSIGNMENT REQUEST message. The length of the U-plane transmission path can thus be minimized. In this case, HNB-GW 1714 does not subject HNB 1704 to the concentration function.

As a result, the effects are obtained in which the signal delay caused by transmission through HNB-GW 1714 is improved, the line cost of Backhaul Network 105 is decreased, and the problem of increase of the capacity of HNB-GW 1714 is avoided.

Modifications of the present exemplary embodiment are next described.

Although a procedure of requesting the establishment of RAB by a RAB ASSIGNMENT REQUEST message was shown in the present exemplary embodiment, the present invention is also applicable to a procedure of requesting establishment of RAB by, for example, a different RELOCATION REQUEST message. In this case, SGSN 1715 is able to notify HNB-GW 1714 in these procedures that SIPTO above RAN has been activated by setting the SIPTO above RAN activation status flag shown in FIG. 13 in these messages.

Although a SIPTO above RAN activation status flag was set in a RANAP message requesting establishment of RAB in the present exemplary embodiment, the SIPTO above RAN activation status flag may also be set in another RANAP message, or may be set in another RNSAP (Radio Network Subsystem Application Part) message or SABP (Service Area Broadcast Protocol) message. Still further, the configuration of the SIPTO above RAN activation status flag may use a form other than the form shown in FIG. 13.

Although operation was described for a case in which SIPTO above RAN is activated for the U-plane of HNB 1704 in the present exemplary embodiment, the present invention is also applicable for a case in which SIPTO above RAN is activated for the U-plane of RNS 1703. In this case as well, the same effects as described above can be obtained.

Although HNB-GW 1714 was used in the present exemplary embodiment, the present invention is also applicable to a case in which a 3G relay system is applied instead of HNB-GW 1714. In this case as well, the same effects as described above can be obtained. In addition, the present invention is also applicable in a case in which functions corresponding to HNB-GW 1714 are applied in an in-house gateway.

Although HNB-GW 1714 itself holds as station data an activation determination flag of the U-plane relay function and determines whether to activate the U-plane relay function in the present exemplary embodiment, HNB-GW 1714 may also determine whether to activate the U-plane relay function without holding station data. A method similar to that of the first exemplary embodiment can be used as this method.

Finally, SGSN 1715 notified HNB-GW 1714 that SIPTO above RAN has been activated in the present exemplary embodiment, HNB-GW 1714 may also be notified whether SIPTO above RAN has been activated by another method. A method similar to the method in the first exemplary embodiment can be used as this method.

(2-3) Effect of the Second Exemplary Embodiment

Due to the above-described configuration, the present exemplary embodiment obtains the effects described hereinbelow.

First Effect: HNB-GW 1714 is able to recognize that SIPTO above RAN has been activated. As a result, HNB-GW 1714 is able to avoid activation of the U-plane relay function, whereby the transmission path of the U-plane can be optimized.

Second Effect: Because the U-plane transmission path can be optimized, an improvement of the U-plane transmission delay can be achieved.

Third Effect: The line cost of Backhaul Network 105 between HNB-GW 1714 and GGSN 1712 that is the offload point can be decreased. In addition, CAPEX on the operator side can be reduced.

Fourth Effect: The problem of an increase in capacity of HNB-GW 1714 due to the offloading of U-plane to HNB-GW 1714 can be avoided. As a result, increased installation of HNB-GW 1714 is unnecessary, and operator-side CAPEX can be decreased.

(3) Third Exemplary Embodiment (3-1) Configuration of the Third Exemplary Embodiment The present exemplary embodiment is an exemplary embodiment in which SIPTO at the Local Network (SIPTO at the Local Network with stand-alone GW (with S-GW and L-GW collocated) function) has been activated in an LTE mobile communication system, the system configuration itself being the same as FIG. 9.

In the present exemplary embodiment, MME 115 sets a parameter (SIPTO at the Local Network activation status flag) for each E-RAB indicating that SIPTO at the Local Network has been activated in a message requesting establishment of E-RAB (for example, an E-RAB Setup Request message, an Initial Context Setup Request message, a Handover Request message, or a Path Switch Request Acknowledgement message) and transmits this message to HeNB-GW 114.

FIG. 19 shows an example of the parameters of the E-RAB SETUP REQUEST message according to the present exemplary embodiment. Comparing with FIG. 2, the SIPTO at the Local Network activation status flag is newly introduced.

FIG. 20 shows the configuration of the SIPTO at the Local Network activation status flag.

The SIPTO at the Local Network activation status flag is a newly introduced flag.

MME 115 sets the SIPTO at the Local Network activation status flag when SIPTO at the Local Network has been activated for an object E-RAB, and does not set the SIPTO at the Local Network activation status flag when SIPTO at the Local Network has not been activated.

Accordingly, MME 115 is able to inform HeNB-GW 114 that SIPTO at the Local Network has been activated by means of the SIPTO at the Local Network activation status flag.

HeNB-GW 114 determines whether to activate the U-plane relay function on the basis of the SIPTO at the Local Network activation status flag that is reported from MME 115.

In the case of SIPTO at the Local Network, the offload point is always on the lower-order side of HeNB-GW 114, in other words, on the side of HeNB 903 and 904 as seen from HeNB-GW 114. As a result, the activation determination flag of the first and second exemplary embodiment is unnecessary.

Finally, in addition to the SIPTO at the Local Network activation status flag, the SIPTO above RAN activation status flag of the first and second exemplary embodiments may also be set in the E-RAB SETUP REQUEST message shown in FIG. 19.

(3-2) Operation of the Third Exemplary Embodiment

Figure 21:
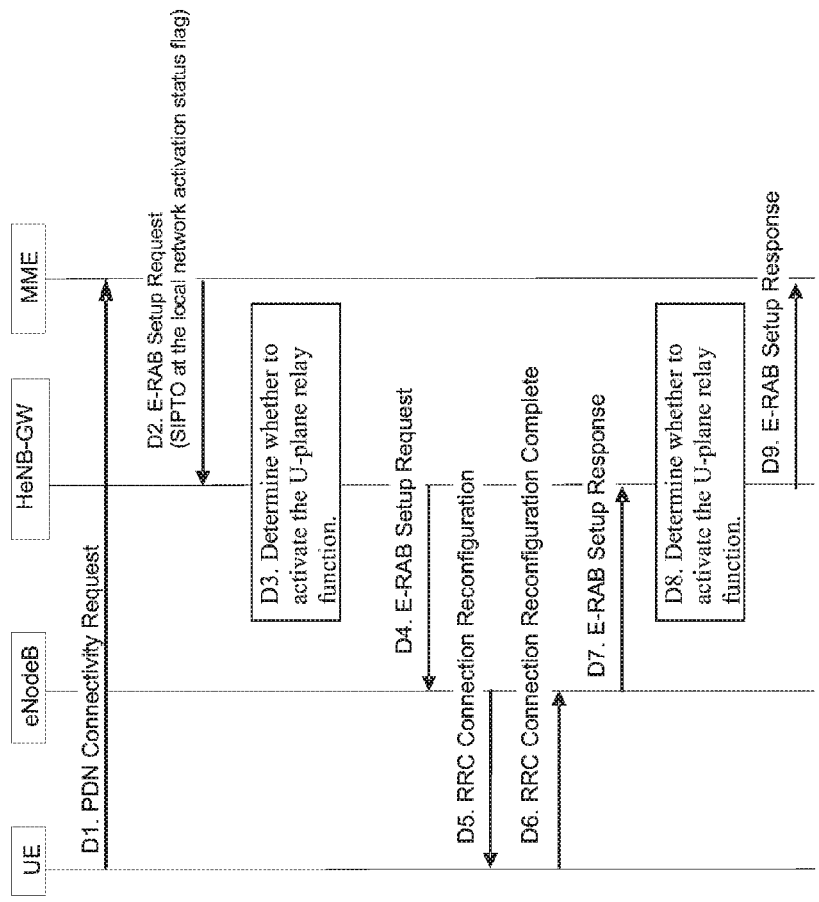
FIG. 21 is a sequence diagram showing the E-RAB establishment operation in the third exemplary embodiment of the present invention.

FIG. 21 shows the sequence in the case of establishing E-RAB in the present exemplary embodiment.

The sequence of FIG. 21 is next described with focus on the differences with FIG. 6.

Step D1: This step is similar to Step A1 of FIG. 6.

Step D2: As in the related art, MME 115 uses DNS 118 to select L-GW 907. In addition, in accordance with the related art ("UE requested PDN connectivity" in section 5.10.2 of 3GPP TS 23.401 Ver 12.1.0), MME 115 supplements the resources of the TEID of L-GW 907, for the bearer of the new PDN connection, as in the related art, and transmits an E-RAB SETUP REQUEST message to HeNB-GW 114. In the present exemplary embodiment, MME 115 here sets the SIPTO at the Local Network activation status flag shown in FIG. 20 in the E-RAB SETUP REQUEST message to inform HeNB-GW 114 that SIPTO at the Local Network has been activated.

Step D3: HeNB-GW 114, upon receiving the E-RAB Setup Request message from MME 115, is able to learn from the SIPTO at the Local Network activation status flag whether SIPTO at the Local Network has been activated.

As a result, HeNB-GW 114 determines whether to activate the U-plane relay function by means of the SIPTO at the Local Network activation status flag that is reported from MME 115.

Figure 22:
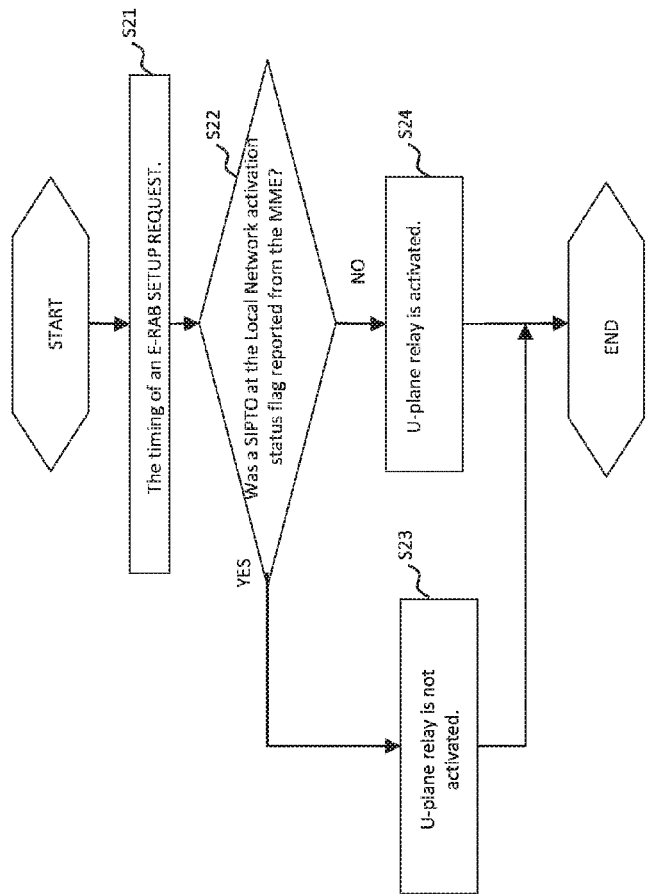
FIG. 22 is a flow chart showing the operation of determining whether to activate the U-plane relay function in the third and fourth exemplary embodiments of the present invention.

FIG. 22 shows the flow of the process of determining whether to activate the U-plane relay function in Step D3.

Step S21: HeNB-GW 114 receives the E-RAB Setup Request message from MME 115.

Step S22: HeNB-GW 114 determines whether the SIPTO at the Local Network activation status flag has been reported from MME 115 at the time of receiving an E-RAB Setup Request message. The process advances to the process of Step S23 if the activation status flag has been reported, and advances to the process of Step S24 if the activation status flag has not been reported.

Step S23: If the SIPTO at the Local Network activation status flag was reported from MME 115 in Step S22, HeNB-GW 114 determines that offload point L-GW 907 is on the lower-order side of HeNB-GW 114, i.e., that L-GW 907 is on the side of HeNB 104 as viewed from HeNB-GW 114, and determines not to activate the U-plane relay function.

Step S24: If the SIPTO at the Local Network activation status flag was not reported from MME 115 in Step S22, HeNB-GW 114 determines to activate the U-plane relay function, as in the related art.

Steps D4-D7: These steps are similar to Steps A3-A6 of FIG. 6.

Step D8: HeNB-GW 114, having received an E-RAB Setup Response message from HeNB 104, determines whether to activate the U-plane relay function in accordance with the result of determining activation of the U-plane relay function at the time of receiving the E-RAB Setup Request message of Step D3.

Step D9: This step is similar to Step A7 of FIG. 6.

According to the present exemplary embodiment, because MME 115 reports that SIPTO at the Local Network has been activated by means of an E-RAB SETUP REQUEST message, the termination of user data on the HeNB-GW 114 side can be prevented without activating the U-plane relay function on the HeNB-GW 114 side. In other words, HeNB-GW 114 does not implement the line concentration function on HeNB 104.

Accordingly, the transport layer address and TEID that were assigned by L-GW 907 are used for the transport layer address and TEID of the E-RAB SETUP REQUEST message that is reported to HeNB 104, and further, the transport layer address and TEID that were assigned by HeNB 903 are used for the transport layer address and TEID that are reported to L-GW 907.

Figure 23:
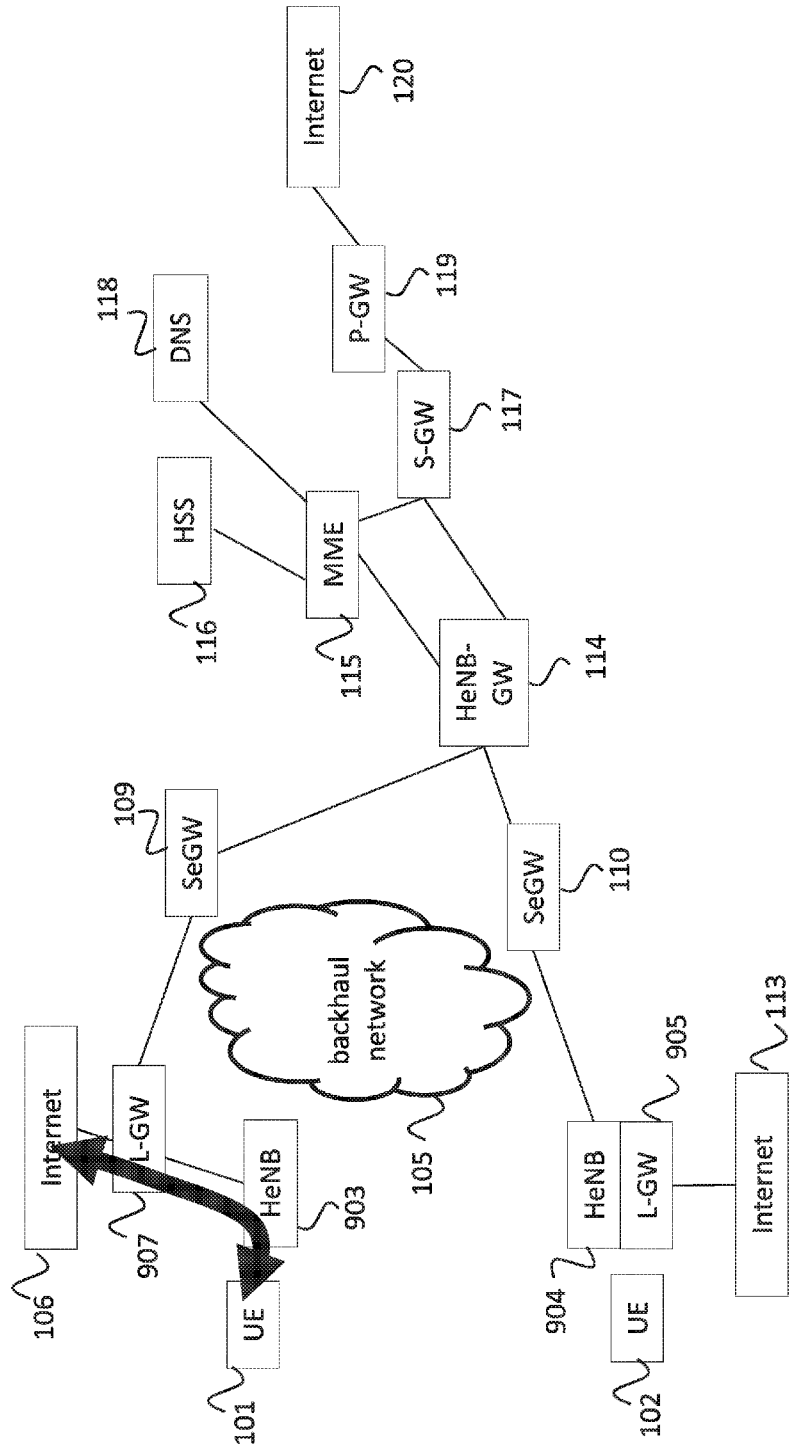
FIG. 23 shows the U-plane transmission path in a case in which SIPTO at the Local Network (offloading in L-GW that is equipped with S-GW/P-GW functions) in the third exemplary embodiment of the present invention.

As a result, a bearer such as in FIG. 23 is established.

As can be understood from FIG. 23, user data are transmitted directly to L-GW 907 without being terminated in HeNB-GW 114, and the U-plane transmission path is therefore shortened compared to the related art (the case of FIG. 10). As a result, the effects are obtained in which signal delay due to transmission through HeNB-GW 114 is improved, the line cost of Backhaul Network 105 is decreased, and the problem of an increase in the capacity of HeNB-GW 114 can be avoided.

Modifications of the present exemplary embodiment are next described.

Although a procedure was shown in the present exemplary embodiment of requesting establishment of E-RAB by an E-RAB SETUP REQUEST message, the present invention is also applicable to a procedure of requesting establishment of E-RAB by another message such as an Initial Context Setup Request message, a HANDOVER REQUEST message, or a PATH SWITCH REQUEST ACKNOWLEDGE message. In this case, MME 115 is able to notify HeNB-GW 114 in these procedures that SIPTO at the Local Network has been activated by setting the SIPTO at the Local Network activation status flag shown in FIG. 20 in these messages. In addition, the configuration of the SIPTO at the Local Network activation status flag may employ a form other than the form shown in FIG. 20. For example, the configuration of the SIPTO at the Local Network activation status flag may be of a configuration that shows the activation of SIPTO at the Local Network or the halt of SIPTO at the Local Network or may be of yet another configuration.

In addition, the MME is able to activate and halt SIPTO at the Local Network by means of an S-GW relocation without UE mobility procedure. For example, because the service does not permit SIPTO when the first E-RAB is established, a bearer is established for user data that is transmitted by way of S-GW 117 and P-GW 119. Subsequently, when there is a request for the establishment of a service in which SIPTO is permitted, and the MME is able to change the S-GW to L-GW 907. In this case, a procedure (S-GW relocation without UE mobility procedure) is activated to change the S-GW even if movement of the UE does not occur. In this case, the MME is able to notify HeNB-GW 114 that SIPTO at the Local Network has been activated by setting the SIPTO at the Local Network activation status flag that is shown in FIG. 20 in, for example, an E-RAB Modify Request message or a UE Context Modification Request message.

When the service in which SIPTO is permitted is released, the MME is able to change the S-GW from L-GW 907 to S-GW 117. In this case, the MME is able to notify HeNB-GW 114 that SIPTO at the Local Network has been halted by not setting the SIPTO at the Local Network activation status flag that is shown in FIG. 20 in, for example, an E-RAB Modify Request message or a UE Context Modification Request message. In this case, the HeNB-GW is able to determine that the U-plane replay function has been activated because HeNB is able to recognize that SIPTO has been halted.

Further, although the SIPTO at the Local Network activation status flag is set in an S1AP message that requests establishment of E-RAB in the present exemplary embodiment, the SIPTO at the Local Network activation status flag may be set in another S1AP message or may be set in, for example, another X2AP message or LPPa message. In addition, the configuration of the SIPTO at the Local Network activation status flag may employ a form other than the form shown in FIG. 13.

Although operation was described for a case in which SIPTO at the Local Network is activated for the U-plane of HeNB 903 in the present exemplary embodiment, the present invention is also applicable for a case in which an eNB that forms a picocell or macrocell is connected to HeNB-GW 114, and SIPTO at the Local Network is activated for the U-plane of that eNB. In this case as well, the same effects as described above can be obtained.

Although HeNB-GW 114 was used in the present exemplary embodiment, the present invention is applicable to a case in which an LTE relay system (3GPP TS 36.300 Ver 11.5.0) is applied instead of HeNB-GW 114 and an RN is applied to DeNB. In this case, effects similar to those described above can be obtained. In addition, the present invention is also applicable to a small-cell enhancement (3GPP TS 36.932 Ver 12.0.0) system in which a macro base station performs mobility control and a base station that forms a small cell carries out U-plane control. Further, the present invention is also applicable to a case in which functions corresponding to HeNB-GW 114 are applied to an in-house gateway.

Although MME 115 reports to HeNB-GW 114 that SIPTO at the Local Network has been activated in the present exemplary embodiment, HNB-GW 1714 may be informed whether SIPTO at the Local Network has been activated by another method.

For example, HeNB-GW 114 may submit an inquiry to MME 115 to learn whether SIPTO at the Local Network has been activated.

Alternatively, the maintenance monitor device of MME 115 and the maintenance monitor device of HeNB-GW 114 may communicate with each other, and the maintenance monitor device of MME 115 may report to the maintenance monitor device of HeNB-GW 114 that SIPTO at the Local Network has been activated for the relevant E-RAB.

Alternatively, HeNB-GW 114 manages, as station data, management information of the IP addresses of L-GW and management information indicating whether an L-GW is the L-GW that was selected as the offload point by MME 115. HeNB-GW 114, at the time of receiving a message requesting establishment of E-RAB from MME 115, may determine that SIPTO at the Local Network has been activated when the transport layer address of the message matches the IP address of the L-GW that is the offload point being managed.

Alternatively, HeNB-GW 114 employs the same method as the method of using DNS 118 to select L-GW when MME 115 activates SIPTO at the Local Network to acquire IP addresses of L-GW which have the possibility of being selected as the offload point in SIPTO at the Local Network. HeNB-GW 114 may then determine that SIPTO at the Local Network has been activated if these IP addresses have been reported in (for example, reported by a message requesting establishment of E-RAB) from MME 115.

Alternatively, UE may synchronize with MME 115 and by the same logic predict whether MME 115 will activate SIPTO at the Local Network, and then, when having predicted that SIPTO at the Local Network will be activated, notifies HeNB-GW 114 that SIPTO at the Local Network has been activated by an NAS message for packet call origination.

(3-3) Effects of the Third Exemplary Embodiment

Due to the above-described configuration of the present exemplary embodiment, effects are obtained as described hereinbelow.

First Effect: HeNB-GW 114 is able to learn that SIPTO at the Local Network has been activated. As a result, HeNB-GW 114 is able to avoid activating the U-plane relay function, and the U-plane transmission path can therefore be optimized.

Second Effect: Because the U-plane transmission path can be optimized, an improvement of the U-plane transmission delay can be achieved.

Third Effect: Line cost of Backhaul Network 105 between HeNB-GW 114 and L-GW 907 that is the offload point can be decreased. In addition, operator-side CAPEX can be reduced.

Fourth Effect: The problem of the increase in capacity of HeNB-GW 114 due to offloading of the U-plane to HeNB-GW 114 can be avoided. As a result, the need for increased installation of HeNB-GW 114 is eliminated and the operator-side CAPEX can be decreased.

(4) Fourth Exemplary Embodiment (4-1) Configuration of the Fourth Exemplary Embodiment The present exemplary embodiment is an exemplary embodiment in which SIPTO at the Local Network (SIPTO at the Local Network with stand-alone GW (with S-GW and L-GW collocated) function) is activated in a 3G mobile communication system.

Figure 24:
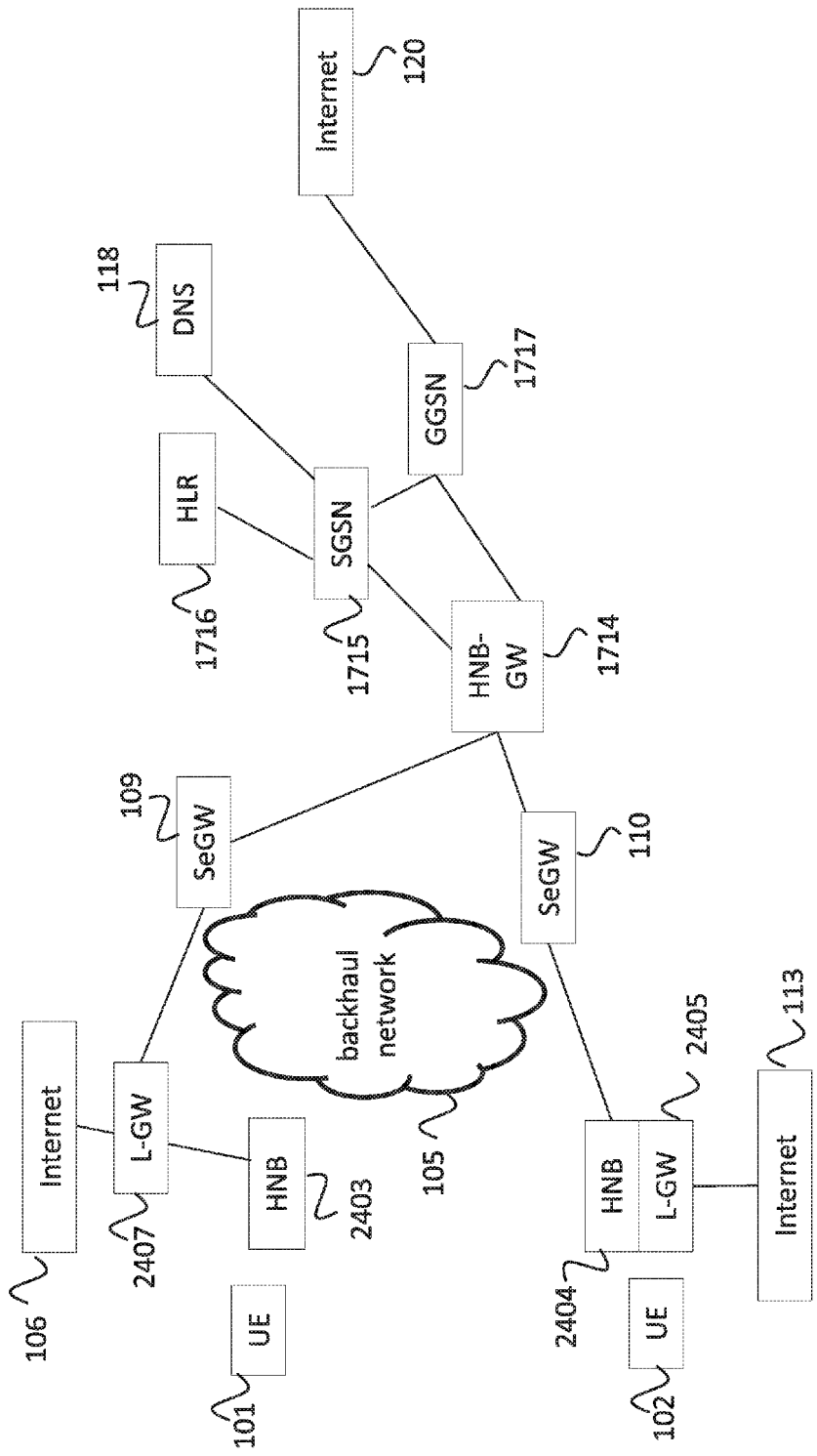
FIG. 24 shows the configuration of a 3G mobile communication system in which SIPTO at the Local Network can be activated.

FIG. 24 shows the outline of the configuration of a 3G mobile communication system in which SIPTO at the Local Network can be activated.

The system configuration shown in FIG. 24 is next described with focus upon the differences with FIG. 17.

L-GW 2407 is a different device from HeNB 2403.

HNB 2404 is provided with the functions of L-GW 2405.

The present exemplary embodiment realizes the offloading of user data to Internet 106 at L-GW 2407 that is a separate device from HeNB 2403.

L-GW 2407 may be installed in a local network, or may be installed in Backhaul Network 105. HNB 2404 is provided with the functions of L-GW 2405 for offloading, but the functions of L-GW for offloading may also be provided in HNB, RNS, and HNB-GW. No particular restrictions apply to the installation locations of L-GW 2405 and 2407.

In a 3G mobile communication system as well, when HNB-GW 2414 activates the U-plane relay function in a state in which SIPTO at the Local Network has been activated, the same problems (signal delay, increase of line cost of Backhaul Network 105, and the problem of capacity increase of HNB-GW 2414) occur as in the first to third exemplary embodiments.

(4-2) Operation of the Fourth Exemplary Embodiment

The present exemplary embodiment uses the SIPTO at the Local Network activation status flag shown in FIG. 20 in place of the SIPTO above RAN activation status flag of the second exemplary embodiment.

In addition, in the present exemplary embodiment, the same procedures as the procedures of the SIPTO at the Local Network of the third exemplary embodiment are applied to the 3G mobile communication system shown in FIG. 24. At this time, HNB-GW 2414 determines whether to activate the U-plane relay function by means of the same method as FIG. 22. Upon learning of the activation of SIPTO at the Local Network, HNB-GW 2414 does not activate the U-plane relay function and does not terminate user data in HNB-GW 2414. In other words, HNB-GW 2414 does not subject HNB 2404 to the concentration function.

(4-3) Effects of the Fourth Exemplary Embodiment

The present exemplary embodiment can apply the same effects as the third exemplary embodiment to a 3G mobile communication system.

Although the present invention has been described with reference to exemplary embodiments, the present invention is not limited to the above-described exemplary embodiments. The configuration and details of the present invention are open to various modifications within the scope of the present invention that will be clear to any one of ordinary skill in the art.

Finally, a summary of the present invention is described.

Figure 25:
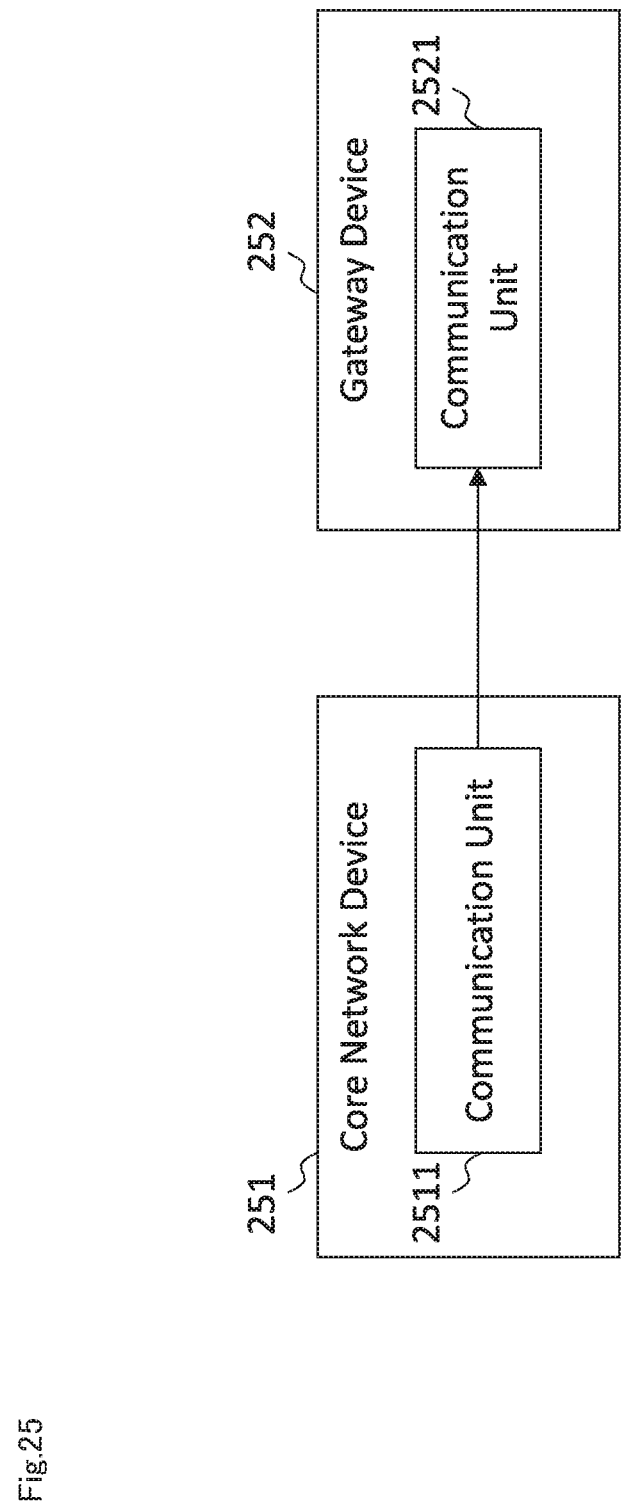
FIG. 25 shows the configuration of an outline of the mobile communication system of the present invention.

FIG. 25 shows a summary of the mobile communication system of the present invention.

As shown in FIG. 25, the mobile communication system of the present invention includes core network device 251 and gateway device 252.

Gateway device 252 connects base stations (not shown) that perform wireless communication with portable terminals (not shown) to a core network.

Core network device 251 is installed in the core network and performs mobility management of the portable terminals The mobile communication system of the present invention is able to activate SIPTO that offloads user data that are transmitted from a portable terminal to an outside network (for example, the Internet) at an offload point that is close to the base station that the portable terminal accessed.

Core network device 251 includes communication unit 2511 that transmits to gateway device 252 information for determining whether to activate SIPTO.

Gateway device 252 includes communication unit 2521 that receives the above-described information from core network device 251.

As a result, the effects are obtained in which gateway device 252 is able to recognize that SIPTO has been activated on the basis of the above-described information that was received from core network device 251.

As the above-described information, core network device 251 may set an activation status flag indicating that SIPTO has been activated in a message requesting establishment of a bearer and transmit this message to gateway device 252. In this case, gateway device 252 may determine that SIPTO has been activated if the activation status flag was set in a message. In addition, core network device 251 may also transmit some type of information when SIPTO has not been activated.

In addition, gateway device 252 may submit an inquiry to core network device 251 as to whether SIPTO has been activated, and may receive a response to this inquiry as the above-described information.

Alternatively, information indicating that SIPTO has been activated may be transmitted as the above-described information from the maintenance management device of core network device 251 to the maintenance management device of gateway device 252.

Core network device 251 may set as the above-described information the IP address of a node that was selected as the offload point in a message requesting establishment of a bearer. In this case, gateway device 252 may hold an IP address of a node that core network device 251 selects as the offload point and then determine that SIPTO has been activated when the IP address that was set in a message received from core network device 251 matches the held IP address.

Alternatively, core network device 251 may set the IP address of a node that was selected as the offload point in a message requesting establishment of a bearer as the above-described information. In this case, gateway device 252 may hold the IP addresses of nodes that have the possibility of being selected as the offload point by core network device 251 and then determine that SIPTO has been activated when the IP address that was set in a message received from core network device 251 matches any of the held IP addresses.

Alternatively, gateway device 252 may have an activation determination flag to determine whether to activate a relay function for relaying user data. The activation determination flag is set to enable activation when the node that has been selected as the offload point is located at a higher level than gateway device 252. At this time, gateway device 252 may determine to activate the relay function upon determining that SIPTO has been activated, and moreover, that the activation determination flag has been set to enable activation; may determine not to activate the relay function upon determining that SIPTO has been activated, and moreover, that the activation determination flag has not been set to enable activation; or may determine to activate the relay function upon determining that SIPTO has not been activated.

Alternatively, gateway device 252 may determine not to activate the relay function upon receiving an S1AP message in which the activation status flag has been set from core network device 251, or may determine to activate the relay function when an S1AP message, in which the activation status flag that has been set, has not been received from core network device 251.

Alternatively, gateway device 252 may determine not to activate the relay function upon determining that SIPTO has been activated, or may determine to activate the relay function upon determining that SIPTO has not been activated.

Gateway device 252 may also receive the above-described information from a portable terminal.

When SIPTO above RAN is activated in an LTE mobile communication system (corresponding to the first exemplary embodiment), core network device 251 is the MME, gateway device 252 is HeNB-GW, and the offload point is S-GW and P-GW that are located at a higher level than RAN.

When SIPTO above RAN has been activated in a 3G mobile communication system (corresponding to the second exemplary embodiment), core network device 251 is SGSN, gateway device 252 is HNB-GW, and the offload point is GGSN that is located at a higher level than RAN.

When SIPTO at the Local Network is activated in an LTE mobile communication system (corresponding to the third exemplary embodiment), core network device 251 is MME, gateway device 252 is HeNB-GW, and the offload point is L-GW located at the local network.

Finally, when SIPTO at the Local Network has been activated in a 3G mobile communication system (corresponding to the fourth exemplary embodiment), core network device 251 is SGSN, gateway device 252 is HNB-GW, and the offload point is L-GW located at the local network.

Core network device 251 and gateway device 252 are provided with a control unit (not shown) other than the above-described communication unit, and of the above-described processes, the above-described control unit is assumed to carry out processes other than the processes having to do with communication that are carried out by the above-described communication unit.

The present exemplary embodiment can be expressed as shown hereinbelow.

If HeNB-GW receives "SIPTO above RAN activation status flag" within the UE context setup procedure and E-RAB setup procedure from the MME, then the S1-U interface from HeNB may not be terminated at the HeNB-GW. If HeNB-GW receives "SIPTO at the Local Network status flag" within the UE context setup procedure and E-RAB setup procedure from the MME, then the S1U interface from HeNB shall not be terminated at the HeNB-GW.

In the case of SIPTO above RAN support, the MME may support the following additional function:
Transfer of the "SIPTO above RAN activation status flag" to indicate that MME activates SIPTO above RAN function within the UE context setup procedure and E-RAB setup procedure.

In the case of SIPTO at the Local Network, the MME may support the following additional function:

Transfer of the "SIPTO at the Local Network status flag" to indicate that MME activates SIPTO at the Local Network within the UE context setup procedure and E-RAB setup procedure.

In the case of SIPTO above RAN support, the MME may support the following additional function:

Transfer of the "SIPTO above RAN activation status flag" to indicate that MME activates SIPTO above RAN function within the UE context setup procedure and E-RAB setup procedure.

In the case of SIPTO at the Local Network support, the MME may support the following additional function:

Transfer of the "SIPTO at the Local Network status flag" to indicate that MME activates SIPTO at the Local Network function within the UE context setup procedure and E-RAB setup procedure.

In addition, the S1 interface in the present exemplary embodiment is defined as shown below.

Between the HeNB-GW and the Core Network

Between the HeNB and the HeNB-GW

The HeNB-GW appears to the MME as an eNB. The HeNB-GW appears to the HeNB as an MME.

In addition, SIPTO at the Local Network in the present exemplary embodiment may be represented as "SIPTO @ LN."

In the present exemplary embodiment, terminating the U-plane (user data) corresponds to terminating the S1-U interface in, for example, LTE.

In the present exemplary embodiment, the concentration function is referred to as, for example, the concentration function.

This application claims the benefits of priority based on Japanese Patent Application No. 2013-230544 for which application was submitted on Nov. 6, 2013 and incorporates by citation all of the disclosures of that application.

What is claimed is:

1. A mobile communication system having:
   a portable terminal;
   a base station that performs wireless communication with said portable terminal;
   a HeNB-GW that connects said base station to a core network; and
   a core network device that is installed in said core network and that performs mobility management of said portable terminal, wherein:
   said core network device transmits to said HeNB-GW information for determining whether or not SIPTO (Setected IP Traffic Offload; IP: Internet Protocol) above a Radio Access Network (RAN) system has been activated; and
   said HeNB-GW provided in the core network receives said information from said core network device, wherein said HeNB-GW controls whether to terminate a U-plane.

2. The mobile communication system as set forth in claim 1 wherein:
   when said core network device determines to activate said SIPTO, said information is information indicating that said SIPTO has been activated.

3. The mobile communication system as set forth in claim 2, wherein:
   said HeNB-GW, upon receiving information indicating that said SIPTO has been activated, implements controls such that said U-plane is not terminated.

4. The mobile communication system as set forth in claim 1, wherein:
   said core network device is configured to include said information in a message that has been transmitted.

5. The mobile communication system as set forth in claim 1, wherein:
   when said core network device determines not to activate said SIPTO, said core network does not include information for determining whether or not said SIPTO has been activated in a message that has been transmitted.

6. The mobile communication system as set forth in claim 5, wherein:
   when information for determining whether or not said SIPTO has been activated is not contained in a message that was received, said HeNB-GW effects control such that said U-plane is terminated.

7. The mobile communication system as set forth in claim 3, wherein:
   when said HeNB-GW receives information indicating that said SIPTO has been activated, the U-plane between said base station and an offload point is transmitted directly without being transmitted by way of said HeNB-GW.

8. The mobile communication system as set forth in claim 1, wherein:
   information for determining whether or not said SIPTO has been activated is transmitted by way of an E-UTRAN Radio Access Bearer (E-RAB) Modify message.

9. The mobile communication system as set forth in claim 1, wherein:
   when, after said SIPTO has been activated, the activation of said SIPTO becomes unnecessary, said core network device, by not setting information for determining whether or not said SIPTO has been activated in an E-UTRAN Radio Access Bearer (E-RAB) Modify message, informs said HeNB-GW of the cancellation of said SIPTO.

10. A HeNB-GW that connects a base station to a core network, comprising:
    a receiver that receives information for determining whether or not SIPTO (Selected IP Traffic Offload; IP: Internet Protocol) above a Radio Access Network (RAN) system has been activated from a core network device that is installed in said core network; and
    a controller configured to control communication of the :HeNB-GW based on the determination whether the SIPTO above the RAN system has been activated, wherein said HeNB-GW controls whether to terminate a U-plane.

11. A core network device that is installed in a core network and that carries out mobility management of a portable terminal comprising:
    a controller that sets information for determining whether or not a SIPTO (Selected IP Traffic Offload; IP: Internet Protocol) above a Radio Access Network (RAN) system has been activated; and
    a transmitter that transmits to a HeNB-GW the information for determining whether or not SIPTO above the RAN system has been activated, wherein said HeNB-GW controls whether to terminate a U-plane.

* * * * *

UNITED STATES PATENT AND TRADEMARK OFFICE
CERTIFICATE OF CORRECTION

Page 1 of 1

PATENT NO. : 10,085,267 B2
APPLICATION NO. : 15/035089
DATED : September 25, 2018
INVENTOR(S) : Ueda It is certified that error appears in the above-identified patent and that said Letters Patent is hereby corrected as shown below:

In the Claims

Claim 10, Column 30, Line 48, ":HeNB-GW" should read as --HeNB-GW--.

Signed and Sealed this
Eighth Day of January, 2019

Andrei Iancu
*Director of the United States Patent and Trademark Office*